(12) United States Patent
Woolfe et al.

(10) Patent No.: US 9,179,041 B2
(45) Date of Patent: Nov. 3, 2015

(54) COLOUR ENCODING CLUSTERING

(75) Inventors: Geoffrey John Woolfe, Umina Beach (AU); Christine Anne Deller, Mount Kurring-gai (AU); Peter Vincent Wyatt, Hunters Hill (AU); Sumit Bhandari, Canberra (AU)

(73) Assignee: Canon Kabushiki Kaisha, Tokyo (JP)

( * ) Notice: Subject to any disclaimer, the term of this patent is extended or adjusted under 35 U.S.C. 154(b) by 131 days.

(21) Appl. No.: 13/327,533

(22) Filed: Dec. 15, 2011

(65) Prior Publication Data

US 2012/0206476 A1 Aug. 16, 2012

(30) Foreign Application Priority Data

Dec. 23, 2010 (AU) ............................. 2010257408

(51) Int. Cl.
*G06T 15/50* (2011.01)
*G06F 15/00* (2006.01)
*H04N 1/46* (2006.01)
*G06K 9/00* (2006.01)
*G06K 9/34* (2006.01)
*H04N 1/60* (2006.01)
*G09G 5/06* (2006.01)

(52) U.S. Cl.
CPC .. *H04N 1/60* (2013.01); *G09G 5/06* (2013.01); *G09G 2320/0673* (2013.01)

(58) Field of Classification Search
CPC ... G09G 5/02; G09G 5/06; G09G 2320/0666; G09G 2340/06; G09G 5/346; G06T 11/001; H04N 1/6058
USPC ................. 345/589, 629, 426, 605, 690, 590; 382/162, 168, 171, 173
See application file for complete search history.

(56) References Cited

U.S. PATENT DOCUMENTS

| 6,243,133 B1* | 6/2001 | Spaulding et al. | 358/516 |
| 6,529,202 B2* | 3/2003 | Wu | 345/593 |
| 7,236,181 B2* | 6/2007 | Ho et al. | 345/601 |
| 7,952,756 B1* | 5/2011 | Kulkarni | 358/1.9 |
| 8,041,111 B1* | 10/2011 | Wilensky | 382/168 |
| 2005/0041034 A1* | 2/2005 | Luo et al. | 345/589 |
| 2009/0274363 A1* | 11/2009 | Dai | 382/164 |
| 2010/0158359 A1* | 6/2010 | Qiao | 382/164 |

* cited by examiner

*Primary Examiner* — Devona Faulk
*Assistant Examiner* — Nicole Gillespie
(74) *Attorney, Agent, or Firm* — Canon USA, Inc., IP Division

(57) ABSTRACT

A method of determining one or more representative color encodings is disclosed. A set of color encoding clusters is determined for a plurality of candidate color encodings based on a clustering criterion related to one or more desired perceptual attributes of the plurality of candidate color encodings. Each candidate color encoding is assigned to one cluster within the set of color encoding clusters. A representative color encoding is determined for each cluster within the set of color encoding clusters depending on the candidate color encodings assigned to each cluster.

16 Claims, 16 Drawing Sheets

| encoding $Y_R, Y_G, Y_B$ gamma values | Number of occurrences in cluster | Representative cluster gammas |
|---|---|---|
| [1.76999, 1.76999, 1.76999, | 16 | |
| [1.8, 1.8, 1.8] | 1 | |
| [1.80077, 1.80077, 1.80077] | 17 | |
| [1.80078, 1.80078, 1.80078] | 5 | [1.799838, 1.799838, 1.799838] |
| [1.800789, 1.800789, 1.800789] | 16 | |
| [1.8008, 1.8008, 1.8008] | 5 | |
| [1.800990, 1.800990, 1.800990] | 1 | |
| [1.800999, 1.800999, 1.800999] | 3 | |

Fig. 8

| Representative colour encoding | |
|---|---|
| $C_{L^*}$ = 9.19238 | $a^*_{1.0}$ = 0.00000 |
| $a^*_{0.25}$ = 0.00000 | $b^*_{1.0}$ = 0.00000 |
| $b^*_{0.25}$ = 0.00000 | $a^*_R$ = 77.91152 |
| $a^*_{0.50}$ = 0.00000 | $b^*_R$ = 70.48452 |
| $b^*_{0.50}$ = 0.00000 | $a^*_G$ = -84.93668 |
| $a^*_{0.75}$ = 0.00000 | $b^*_G$ = 72.03419 |
| $b^*_{0.75}$ = 0.00000 | $a^*_B$ = 60.04800 |
| | $b^*_B$ = -105.43734 |

1310

| First input colour encoding | |
|---|---|
| $C_{L^*}$ = 9.19194 | $a^*_{1.0}$ = 0.00000 |
| $a^*_{0.25}$ = 0.00000 | $b^*_{1.0}$ = 0.00000 |
| $b^*_{0.25}$ = 0.00000 | $a^*_R$ = 77.91152 |
| $a^*_{0.50}$ = 0.00000 | $b^*_R$ = 70.48452 |
| $b^*_{0.50}$ = 0.00000 | $a^*_G$ = -84.93668 |
| $a^*_{0.75}$ = 0.00000 | $b^*_G$ = 72.03419 |
| $b^*_{0.75}$ = 0.00000 | $a^*_B$ = 60.04800 |
| | $b^*_B$ = -105.43734 |

1320

| Second input colour encoding | |
|---|---|
| $C_{L^*}$ = 9.19238 | $a^*_{1.0}$ = 0.00000 |
| $a^*_{0.25}$ = 0.00000 | $b^*_{1.0}$ = 0.00000 |
| $b^*_{0.25}$ = 0.00000 | $a^*_R$ = 76.90155 |
| $a^*_{0.50}$ = 0.00000 | $b^*_R$ = 68.08362 |
| $b^*_{0.50}$ = 0.00000 | $a^*_G$ = -91.48345 |
| $a^*_{0.75}$ = 0.00000 | $b^*_G$ = 73.95644 |
| $b^*_{0.75}$ = 0.00000 | $a^*_B$ = 71.14108 |
| | $b^*_B$ = -101.89768 |

COLOUR ENCODING CLUSTERING

CROSS-REFERENCE TO RELATED PATENT APPLICATION(S)

This application claims the benefit under 35 U.S.C. §119 of the filing date of Australian Patent Application No. 2010257408, filed 23 Dec. 2010, hereby incorporated by reference in its entirety as if fully set forth herein.

FIELD OF INVENTION

The current invention relates to the field of colour encoding clustering and colour information conversion, in particular, to a method and apparatus for determining a representative colour encoding and maintaining colour fidelity while making efficient re-use of colour transforms. The current invention also relates to a computer program product including a computer readable medium having recorded thereon a computer program for determining a representative colour encoding.

DESCRIPTION OF BACKGROUND ART

Graphics packages are currently available for rendering images such as printed pages to printers, display screens, or for output to software files to be stored in storage devices. Some of these graphics packages utilise a high-level page description language for effecting the layout of the printed pages. These graphics packages typically comprise a rendering system, which converts the high-level page description of the page layout into pixel data that can be used as raster data to be printed or displayed.

Computer-generated images are typically made up of many different components or graphical elements which are rendered and composited together to create a final image. The rendering and compositing may be performed by special-purpose hardware, or by software running on a general or special-purpose computer system, such as a microprocessor inside a printer. These graphical elements are processed by a document interpreter within the rendering system, which sends drawing commands across a drawing interface. From the drawing commands, a final description of the page to be printed is generated, which comprises a description of each graphical element. Examples of graphical elements include text strings, paths and images. This final description is called a display list. The display list is then spooled (ie transferred) to a print engine in the target printer.

In order to achieve faithful colour reproduction, applications that create high-level page descriptions will sometimes represent different graphical elements using a colour space, or more specifically a colour encoding.

Colour conversion (sometimes called colour space conversion) is the process of converting one or more colours that are represented using a particular colour encoding (called the input colour encoding) to a new representation using a different colour encoding (called the output colour encoding).

Colour conversion is usually performed by means of a colour conversion transform (often called a "colour transform" for brevity). A colour transform is a mathematical filter that, when the numeric parameters of a colour in an input colour encoding is provided to it as input, produces the numerical parameters of a colour in an output colour encoding that represents an equivalent colour.

Mathematical transforms that are associated with a colour space may be used for converting from one colour encoding to another colour encoding through an intermediate device-independent colour space. When such a conversion is required the mathematical transforms may be evaluated or implemented numerically using computer software. The evaluation typically involves the construction and subsequent interpolation of single-dimensional or multi-dimensional lookup tables. The construction and interpolation operations are frequently computationally intensive, requiring significant amounts of computer memory and central processing unit (CPU) time.

Typically, in order to increase the speed at which colour conversion can be performed, a colour transform combines what is usually a multi-stage mathematical process into a very small number of stages, by generating look-up tables or other intermediate data. As a result, colour transforms are often computationally expensive to create. A known technique of mitigating this computational cost is caching. For example, if a rendering system is required to colour convert an object from its input colour encoding to a common rendering colour encoding, the rendering system will create a colour transform that can perform the conversion, use it, and then store the colour transform in memory, so that if the same conversion needs to be performed on a subsequent object, the colour transform can be retrieved from memory instead of re-creating it, improving the performance of the rendering system.

The terms colour space and colour encoding are sometimes used interchangeably; in this specification a distinction is made. A colour space (sometimes called a colour model) is mathematical abstraction consisting of an ordered set of primary colours (or primaries). Colours within the colour space are specified by an ordered list of numbers corresponding to the primaries. For example, RGB is a family of additive colour spaces in which colours are defined by three numbers, corresponding to the red, green, and blue primaries. All colours defined by that colour space are defined as an additive mixture of particular amounts of red, green, and blue. (Not all colour spaces are additive.)

A colour encoding is a fuller specification that incorporates the colour space, such as RGB, and additional properties such as white point, gamma, gamut, and chromaticity of the primaries of the colour space, that allows colours in the colour encoding to be accurately converted to different colour encoding representations, and ultimately to be reproduced correctly on an output device. These properties are called colour encoding parameters. For a single colour space, there can exist many possible colour encodings, each having differences in one or more colour encoding parameter values to other colour encodings.

Colour profiles and colour management systems may be used for the unambiguous communication of colour information. A colour profile is a software container which includes a colour encoding specification in addition to one or more colour transforms used to transform colours from the profiles colour encoding to a new colour encoding. The colour encoding transforms, ie the colour transforms associated with a particular colour encoding, are typically used to convey information about colour reproduction intents. The information is conveyed from devices and systems that create colour images or documents to devices or systems that display or print colour images or documents.

The number of colour encodings in practical use has continued to increase to the point where there are many thousands in current use. The proliferation of colour encodings provides a very high level of flexibility but also carries with it a significant inefficiency. The inefficiency comes about in the computer computation time and memory required to build numerical implementations of many different colour encoding transforms.

The inefficiency of dealing with a large diversity of colour encodings is reflected in the cost and sophistication of the equipment required for rendering, displaying and/or printing colours. The inefficiency of dealing with a large diversity of colour encodings is also reflected in the time taken to perform the rendering. Time taken to build colour encoding transforms can result in speed losses that make rendering operations unviable. The time taken to build colour encoding transforms may also result in significant productivity losses in production printing applications.

Another method to increase the speed of colour conversion is to pre-build colour transforms that are known to be popular. For example, a CalRGB colour encoding in the Adobe Portable Document Format (PDF) with a standard D50 white point (0.9643, 1.000, 0.8251), gamma of 2.2, and sRGB chromaticities is a popular colour encoding, and so the colour transform that converts a colour from this colour encoding to another particular encoding can be created before any image data is processed, and used whenever a colour encoding is encountered that matches this encoding.

However, colour encoding parameters are specified using a floating point representation, and many of these parameters are derived values. The accuracy with which a calculation is performed to arrive at a derived value, or the number of decimal places stored in the floating point representation, or rounding decisions made by programmers or graphic artists at many stages along the production of these values, can all lead to slight variations in the exact values. For example, an application that produces a colour encoding having a white point of (0.96421, 1.00000, 0.82519) would fail to re-use a pre-built colour transform for a colour encoding having a white point of (0.9643, 1.0000, 0.8251) in a rendering system that tests for equal colour encoding parameters when deciding whether to re-use a pre-built transform.

One solution to this problem is to allow a numerical margin of error when comparing colour encoding parameter values. The drawback to this solution is that there exist many colour encodings for which a small variation in some colour encoding parameters will produce a large visual difference. Conversely, there can exist colour encodings that are visually very similar but with significant numerical differences. Therefore, this approach introduces an undesirable trade-off between colour accuracy and performance (via re-use of colour transforms).

Thus, a need clearly exists for a more efficient method of determining a representative colour encoding from a large number of candidate colour encodings.

SUMMARY OF THE INVENTION

It is an object of the present invention to substantially overcome, or at least ameliorate, one or more disadvantages of existing arrangements.

According to one aspect of the present disclosure, there is provided a method of determining one or more representative colour encodings, said method comprising:

determining a set of colour encoding clusters for a plurality of candidate colour encodings based on a clustering criterion related to one or more desired perceptual attributes of the plurality of candidate colour encodings, wherein at least some of the candidate colour encodings are associated with a mapping from a first colour space to a second colour space;

assigning each candidate colour encoding to one cluster within the set of colour encoding clusters; and determining a representative colour encoding for each cluster within the set of colour encoding clusters depending on the candidate colour encodings assigned to each cluster.

According to another aspect of the present disclosure, there is provided a method of colour converting an image from an input colour encoding to an output colour encoding, wherein the input colour encoding is associated with a first colour space and the output colour encoding is associated with a second colour space, said method comprising the steps of:

building a set of representative colour encodings using a clustering technique, each said representative colour encoding being associated with a colour transform;

calculating a first perceptual parameter of the input colour encoding;

determining a second perceptual parameter of at least some of the representative colour encodings;

comparing the first perceptual parameter and each of the second perceptual parameters;

selecting a representative colour encoding from the set of colour encodings based on said comparing step; and using the colour transform associated with the selected representative colour encoding to colour convert the image to the output colour encoding.

According to still another aspect of the present disclosure, there is provided an apparatus for determining one or more representative colour encodings, said apparatus:

means for determining a set of colour encoding clusters based on a clustering criterion related to one or more desired perceptual attributes of a plurality of candidate colour encodings, wherein at least some of the candidate colour encodings are associated with a mapping from a first colour space to a second colour space;

means for assigning each candidate colour encoding to one cluster within the set of colour encoding clusters; and means for determining a representative colour encoding for each cluster within the set of colour encoding clusters depending on the candidate colour encodings assigned to each cluster.

According to still another aspect of the present disclosure, there is provided a system for determining one or more representative colour encodings, said system comprising:

a memory for storing data and a computer program;

a processor coupled to said memory for executing said computer program, said computer program comprising instructions for;

determining a set of colour encoding clusters based on a clustering criterion related to one or more desired perceptual attributes of a plurality of candidate colour encodings, wherein at least some of the candidate colour encodings are associated with a mapping from a first colour space to a second colour space;

assigning each candidate colour encoding to one cluster within the set of colour encoding clusters; and determining a representative colour encoding for each cluster within the set of colour encoding clusters depending on the candidate colour encodings assigned to each cluster.

According to still another aspect of the present disclosure, there is provided a computer readable medium having a computer program stored thereon for determining one or more representative colour encodings, said program comprising:

code for determining a set of colour encoding clusters based on a clustering criterion related to one or more desired perceptual attributes of a plurality of candidate colour encodings, wherein at least some of the candidate colour encodings are associated with a mapping from a first colour space to a second colour space;

code for assigning each candidate colour encoding to one cluster within the set of colour encoding clusters; and code for determining a representative colour encoding for each cluster within the set of colour encoding clusters depending on the candidate colour encodings assigned to each cluster.

Other aspects of the invention are also disclosed.

BRIEF DESCRIPTION OF THE DRAWINGS

One or more embodiments of the invention will now be described with reference to the following drawings, in which:

FIG. 8 is a table of example clustered encodings in a single cluster selected from a final set of clusters of colour encodings;

FIG. 13 is a schematic block diagram showing the perceptual colour parameter values of the RGB colour encodings of FIG. 12, as calculated according to the RCER arrangement.

DETAILED DESCRIPTION OF EMBODIMENTS OF THE INVENTION

Figure 1A:
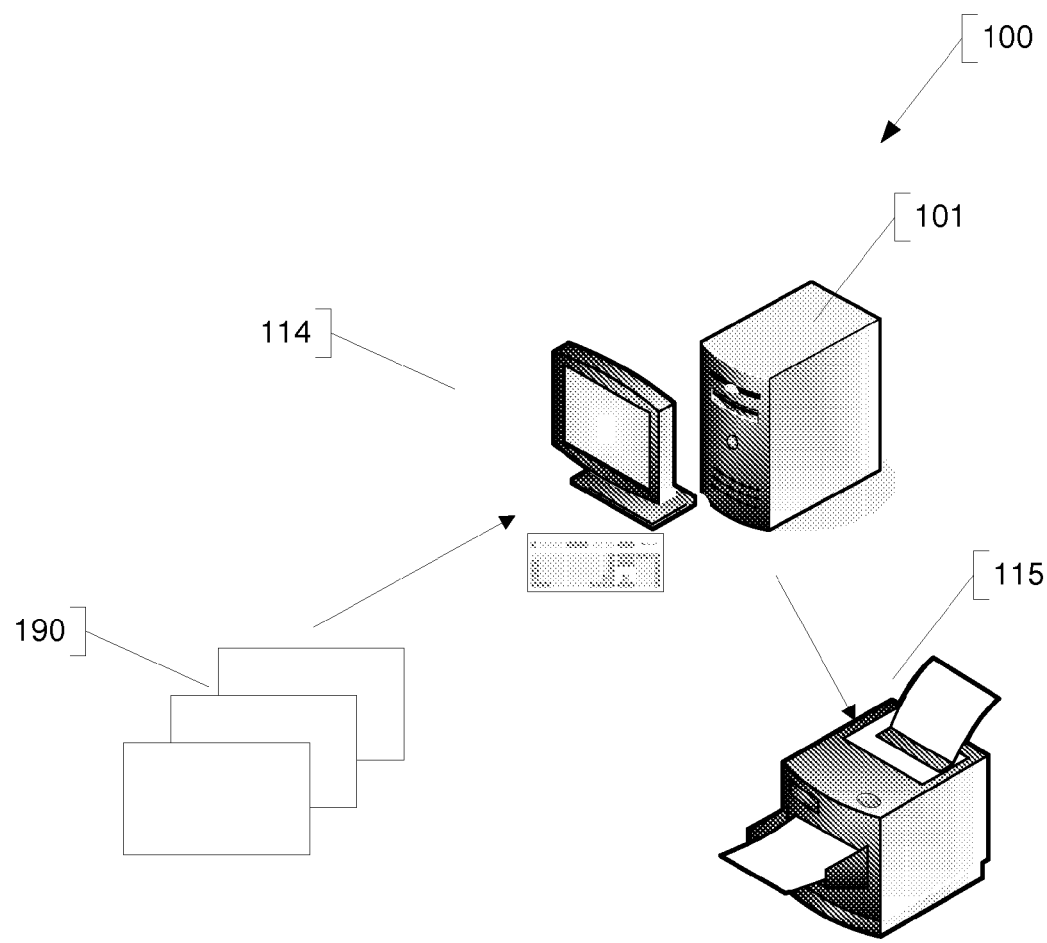
FIGS. 1A, 1B and 1C form a schematic block diagram of a general purpose computer system upon which described methods may be practiced.

Where reference is made in any one or more of the accompanying drawings to steps and/or features, which have the same reference numerals, those steps and/or features have for the purposes of this description the same function(s) or operation(s), unless the contrary intention appears.

Methods of determining a representative colour encoding, from a large number of candidate colour encodings, will be described below. In particular, a method 200 (see FIG. 2) of determining a representative colour encoding, will be described below with reference to FIG. 2. The method 200 is used for managing a large number of colour encodings.

One method of managing a large number of different colour encodings is to reduce the number of colour encodings to a smaller, much more manageable number. Unfortunately, such a method is not as simple as culling the large numbers of colour encodings, leaving only a small number of standardized encodings. Culling the large numbers of colour encodings would leave a huge number of images or documents having deprecated colour encodings. Such images and documents would be extremely difficult to render and would require considerable effort to be processed.

The described methods determine a small number of 'representative colour encodings' that may be used as substitutes (or replacements) for a much larger diversity of candidate colour encodings. The described methods allow numerical representations of the colour encodings to be substituted by a smaller number of representative colour encodings. The representative colour encodings are determined and cached prior to the representative colour encodings being required. The method 200 of determining representative colour encodings uses cluster analysis. The described methods replace a large number of distinct candidate colour encodings with a smaller number.

Cluster analysis or clustering refers to the division and assignment of a set of data into subsets referred to as clusters. Data members of a cluster are determined to be more similar to each other than the data members are to data members of other clusters. A criterion used to determine similarity is dependent on application and ultimately determines how clusters are formed from the data. Numerous methods for performing clustering are available including "hierarchical clustering", "partitional clustering" and "spectral clustering".

Cluster analysis is used for clustering individual colours. An example of individual colour clustering is colour quantization for reducing the colour palette of an image by creating indexed colour images with a limited discrete colour palette. Another example of individual colour clustering is the clustering of dominant colours in images and documents for use with indexing or image retrieval systems. Yet another example of individual colour clustering is the colour clustering method used for segmenting images on the basis of colour. All of the above examples of individual colour clustering involve the clustering of individual colours to form sets or groups of colours.

In individual colour clustering, colours may be thought of as points in multi-dimensional colour space. However, with clustering of colour encodings, the colour encodings are a set of complex specifications and transforms that allow interpretation of a collection of colour points.

The described methods may be used for clustering colour encodings and their application to colour management. As discussed above, a colour encoding is associated with a set of mathematical transforms or mappings that describe the relationship between the colour encoding and a particular device-independent colour space such as CIE XYZ or CIELab, where CIE refers to the "Commission Internationale de l'Eclairage".

The described methods use properties of the encodings to cluster colour encodings rather than clustering colours themselves. The described methods are based on the impact of the mathematical transforms associated with the encodings on selected perceptual colour attributes. As described below, desired perceptual colour attributes may be those attributes that are considered important to the visual perception of the colours to be reproduced.

The methods are described with reference to a collection of additive colour encodings. However, the described methods are also applicable to other colour encoding schemes, such as subtractive colour encodings.

Colour information in images or documents is encoded numerically. However, there is no single standard encoding method used to universally represent colour information. Instead, the numerical colour information is interpreted according to a colour encoding. A colour encoding is a specification that allows a numerical description of a colour to be interpreted to determine the intended appearance of the colour.

A colour encoding defines the colour space in which the colours are numerically encoded. A colour encoding may also define properties of a reference medium or device upon which the colours will be rendered and a reference viewing environment in which the colours are intended to be viewed. Colour encodings are often represented using colour management profiles—those profiles are often compliant with the International Color Consortium (ICC) colour profile specification. Colour encodings may be represented in other ways defined by certain companies involved in imaging, printing and display industries. For example one company, known by the trade mark: Adobe™, has published specifications for standards for associating colour encoding definitions with objects in Portable Document Format (PDF) files. These standards, including the specification of the family of additive colour spaces known as CalRGB, are published in the Adobe™ PDF Reference.

Colour encodings are associated with one or more mathematical transforms that specify the mathematical relationship between the colour encoding and a standard, usually device-independent, colour space such as CIE XYZ or CIELab. The CIE XYZ and CIELab are often referred to as device-independent colour spaces since their descriptions of colour apply to the human visual system.

As described above, CIE XYZ and CIELab are examples of device independent colour spaces. There are other colour spaces that are also device-independent, such as CIELuv, IPT and CIECAM02. While most if not all device-independent colour spaces are based on the human visual system, not all such colour spaces are perceptually uniform. A perceptually uniform colour space is one in which the distance between colours encoded in the colour space is in proportion to the colour difference between the colours as perceived by the human visual system. From the selected examples given above, CIE XYZ is the only device-independent colour space that is also not approximately perceptually uniform.

Additive colour encodings are based on a physical model of mixing three light sources, usually referred to as "primaries". Typically, the three primaries are red, green and blue light sources and so additive colour encodings are often referred to as RGB colour encodings or RGB colour spaces. The relationship of the colour encodings of RGB to CIE XYZ may be defined by transforms consisting of a mapping between encoding values and relative radiance of the primaries and a linear transform from the relative radiance of the primaries to CIE XYZ. Such a transform is shown in Equation [1], below.

$$R' = f_R(R)$$
$$G' = f_G(G)$$
$$B' = f_N(B)$$
$$\begin{bmatrix} X \\ Y \\ Z \end{bmatrix} = \begin{bmatrix} a_{11} & a_2 & a_{13} \\ a_{21} & a_{22} & a_{23} \\ a_{31} & a_{32} & a_{33} \end{bmatrix} \begin{bmatrix} R' \\ G' \\ B' \end{bmatrix} \quad [1]$$

In Equation [1], R, G and B represent normalized encoded values for red, green and blue colour channels, respectively. Further, R', G' and B' represent relative radiances of the red, green and blue primaries, respectively. The relative radiances are generally normalized to a maximum value of one (1.0). CIE XYZ tristimulus values are represented by the symbols X, Y and Z in Equation [1]. The 3×3 matrix is referred to as a primary matrix and maps the three relative radiances of a colour to the CIE XYZ tristimulus values for the colour.

There are two widely used conventions for CIE XYZ colorimetry. The first is that the XYZ values are normalized so that an illuminant or reference white has a Y value of one (1.00). The second is to normalize the CIE XYZ values so that an illuminant or reference white has a Y value of one hundred (100).

Throughout the following description, the XYZ values are normalized so that an illuminant or reference white has a Y value of one (1.00), unless the contrary intention appears. However, it will be appreciated that the normalization of XYZ values, so that an illuminant or reference white has a Y value of other than one, may be used depending on colorimetric scaling used. For example, a Y value of one hundred (100) may be used. For the normalisation of the XYZ values as described above, the values used in the primary matrix are scaled such that the white point of the encoding results in a Y value of one (1.0).

In Equation [1], $f_P(P)$ represents a set of functions, where P represents either R, G or B. The set of functions represented by $f_P(P)$ are functions that are often based on considerations of the relationship between radiance and perceived brightness. The set of functions represented by $f_P(P)$ are configured to limit the perceptual difference between successive R, G or B encoding values to the magnitude of a just noticeable difference. Accordingly, the set of functions may be simple exponential functions in which the exponent is referred to as a 'gamma value'. The definition for $f_P(P)$, used in the CalRGB family of colour encodings specified for use in Portable Document Format (PDF) documents is given in Equation [2], below.

$$R' = R^{\gamma_R}$$
$$G' = G^{\gamma_G}$$
$$B' = B^{\gamma_B} \quad [2]$$

where the parameters $\gamma_R$, $\gamma_G$ and $\gamma_B$ are called the gamma values of the encoding.

Some additive colour encodings use more complex nonlinear mapping functions. For example, the standardized sRGB colour encoding uses the definition for $f_P(P)$ given in Equation [3], below.

If $P' \leq 0.03928$ [3]

$$P' = \frac{P}{12.92}$$

else if $P' > 0.03928$ $$P' = \left[ \frac{(P + 0.055)}{1.055} \right]^{2.4}$$

where $P$ represents either $R$, $G$ or $B$.

Returning now to Equation [1], the columns of the matrix are scaled values of the CIE XYZ tristimulus values of the primaries of an encoding, as shown in Equation [4], below.

$$\begin{bmatrix} X \\ Y \\ Z \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} R' \\ G' \\ B' \end{bmatrix} = \begin{bmatrix} k_R X_R & k_G X_G & k_B X_B \\ k_R Y_R & k_G Y_G & k_B Y_B \\ k_R Z_R & k_G Z_G & k_B Z_B \end{bmatrix} \begin{bmatrix} R' \\ G' \\ B' \end{bmatrix} \quad [4]$$

where scaling coefficients $k_R$, $k_G$ and $k_B$ effectively define relative radiant powers of each of the primaries. Hence, the scaling coefficients $k_R$, $k_G$ and $k_B$ are the white points of the encoding.

Figure 1B:
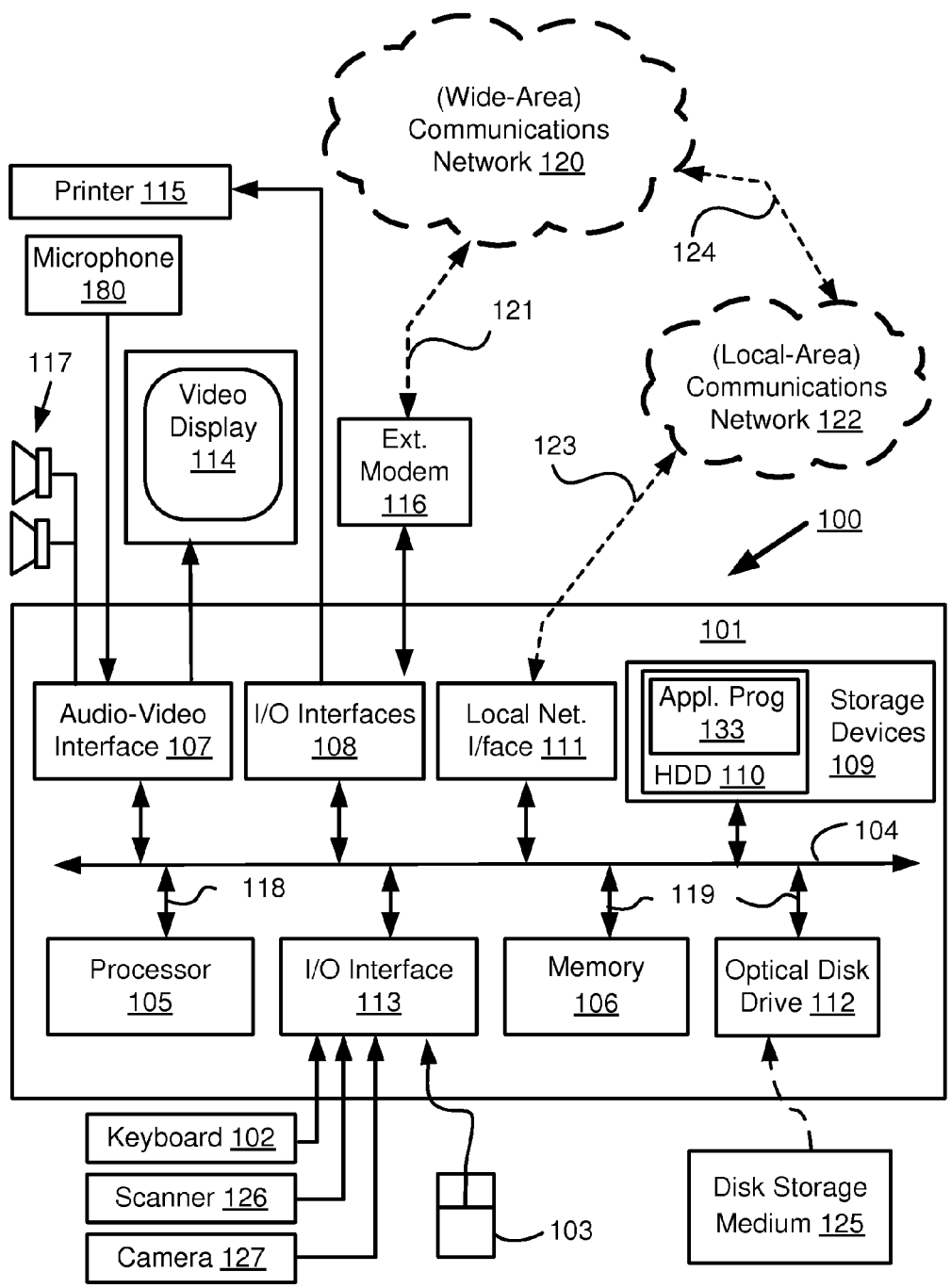
Figure 1C:
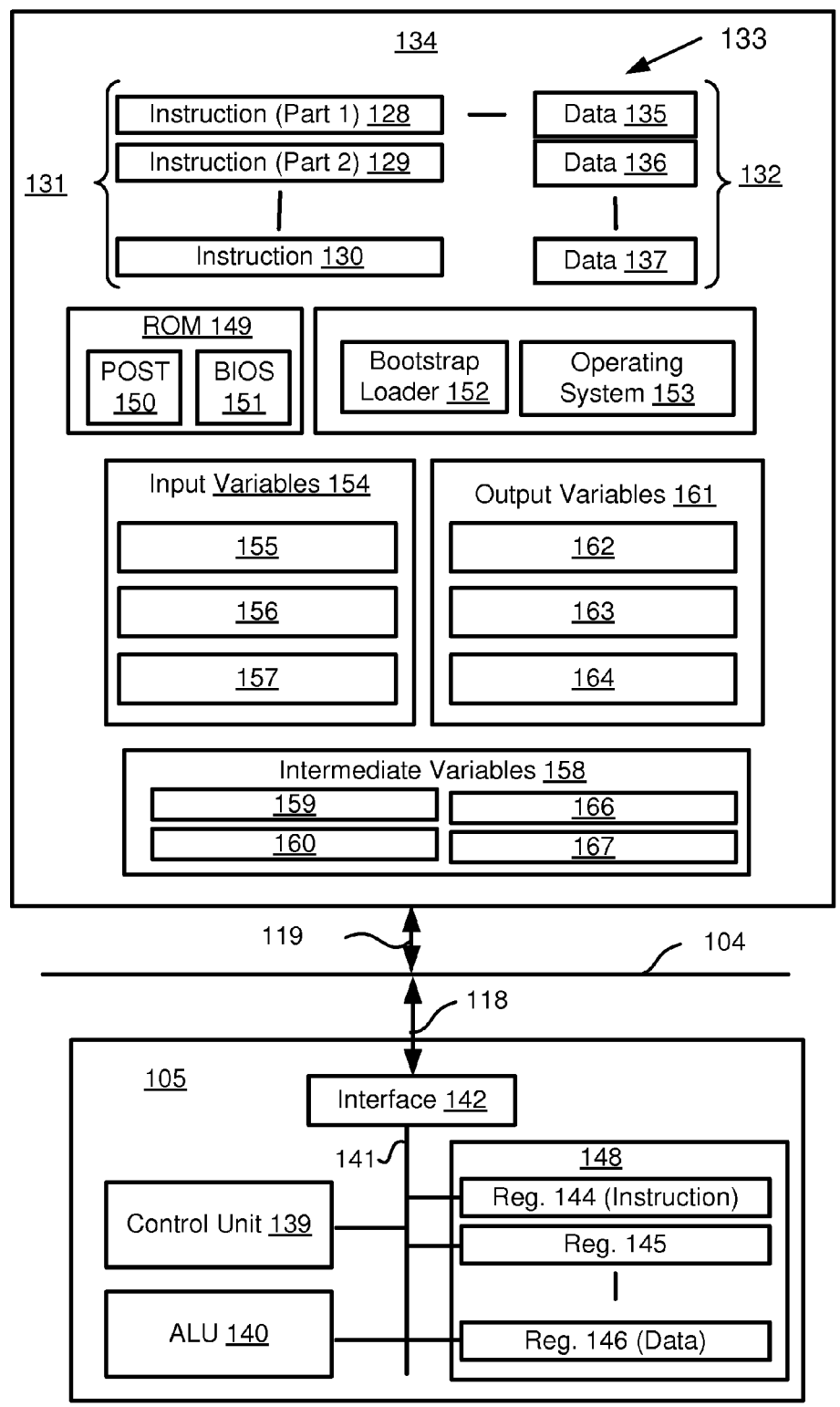

FIGS. 1A, 1B and 1C depict a general-purpose computer system 100, upon which the described methods may be practiced. The system 100 takes as input digital document files 190. The digital document files 190 contain specifications for the content, layout and colour reproduction of documents to be printed on the printer 115. The digital document files 190 may be encoded using any suitable page description computer language. Each digital document file 190 includes one or more colour encodings that specify the interpretation of colour data within a corresponding document file. The system 100 also includes a computer module 101, as described in detail below, for use in interpreting the page description language of a document file and sending an image of the corresponding document to the printer 114. In addition to interpreting the page description language, the computer module 101 may be used for performing colour encoding clustering as used in the described methods. The computer module 101 may also be used for substituting (or replacing) new encodings, derived from the colour encodings in a document.

As seen in FIG. 1B, the computer system 100 includes: the computer module 101; input devices such as a keyboard 102, a mouse pointer device 103, a scanner 126, a camera 127, and a microphone 180; and output devices including the printer 115, the display device 114 and loudspeakers 117. An external Modulator-Demodulator (Modem) transceiver device 116 may be used by the computer module 101 for communicating to and from a communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes at least one processor unit 105, and a memory unit 106. For example, the memory unit 106 may have semiconductor random access memory (RAM) and semiconductor read only memory (ROM). The computer module 101 also includes an number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not shown); and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1B, the local communications network 122 may also couple to the wide network 120 via a connection 124, which would typically include a so-called "firewall" device or device of similar functionality. The local network interface 111 may comprise an Ethernet™ circuit card, a Bluetooth™ wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or a like computer systems.

The described methods may be implemented using the computer system 100 wherein the processes of FIGS. 2, 6, 9, 10 and 14, to be described, may be implemented as one or more software application programs 133 executable within the computer system 100. In particular, the steps of the described methods are effected by instructions 131 (see FIG. 1C) in the software 133 that are carried out within the computer system 100. The software instructions 131 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 100 from the computer readable medium, and is then executed by the computer system 100. A computer readable medium having such software or computer program recorded on the computer readable medium is a computer program product. The use of the computer program product in the computer system 100 preferably effects an advantageous apparatus for implementing the described methods.

The software 133 is typically stored in the HDD 110 or the memory 106. The software is loaded into the computer system 100 from a computer readable medium, and executed by the computer system 100. Thus, for example, the software 133 may be stored on an optically readable disk storage medium (e.g., CD-ROM) 125 that is read by the optical disk drive 112. A computer readable medium having such software or computer program recorded on it is a computer program product.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1C is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1B.

When the computer module 101 is initially powered up, a power-on self-test (POST) program 150 executes. The POST program 150 is typically stored in a ROM 149 of the semiconductor memory 106 of FIG. 1B. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1B. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1B must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 1C, the processor 105 includes a number of functional modules including a control unit 139, an arithmetic logic unit (ALU) 140, and a local or internal memory 148, sometimes called a cache memory. The cache memory 148 typically include a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 1105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 1B. The execution of a set of the instructions may in some cases result in output of data. Execution may also involve storing data or variables to the memory 134.

The described methods use input variables 154, which are stored in the memory 134 in corresponding memory locations 155, 156, 157. The described methods produce output variables 161, which are stored in the memory 134 in corresponding memory locations 162, 163, 164. Intermediate variables 158 may be stored in memory locations 159, 160, 166 and 167.

Referring to the processor 105 of FIG. 1C, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

(a) a fetch operation, which fetches or reads an instruction 131 from a memory location 128, 129, 130;

(b) a decode operation in which the control unit 139 determines which instruction has been fetched; and (c) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIGS. 2, 6, 9, 10 and 14 is associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

The described methods may alternatively be implemented in dedicated hardware such as one or more integrated circuits performing the functions or sub functions of the described methods. Such dedicated hardware may include graphic processors, digital signal processors, or one or more microprocessors and associated memories.

Figure 2:
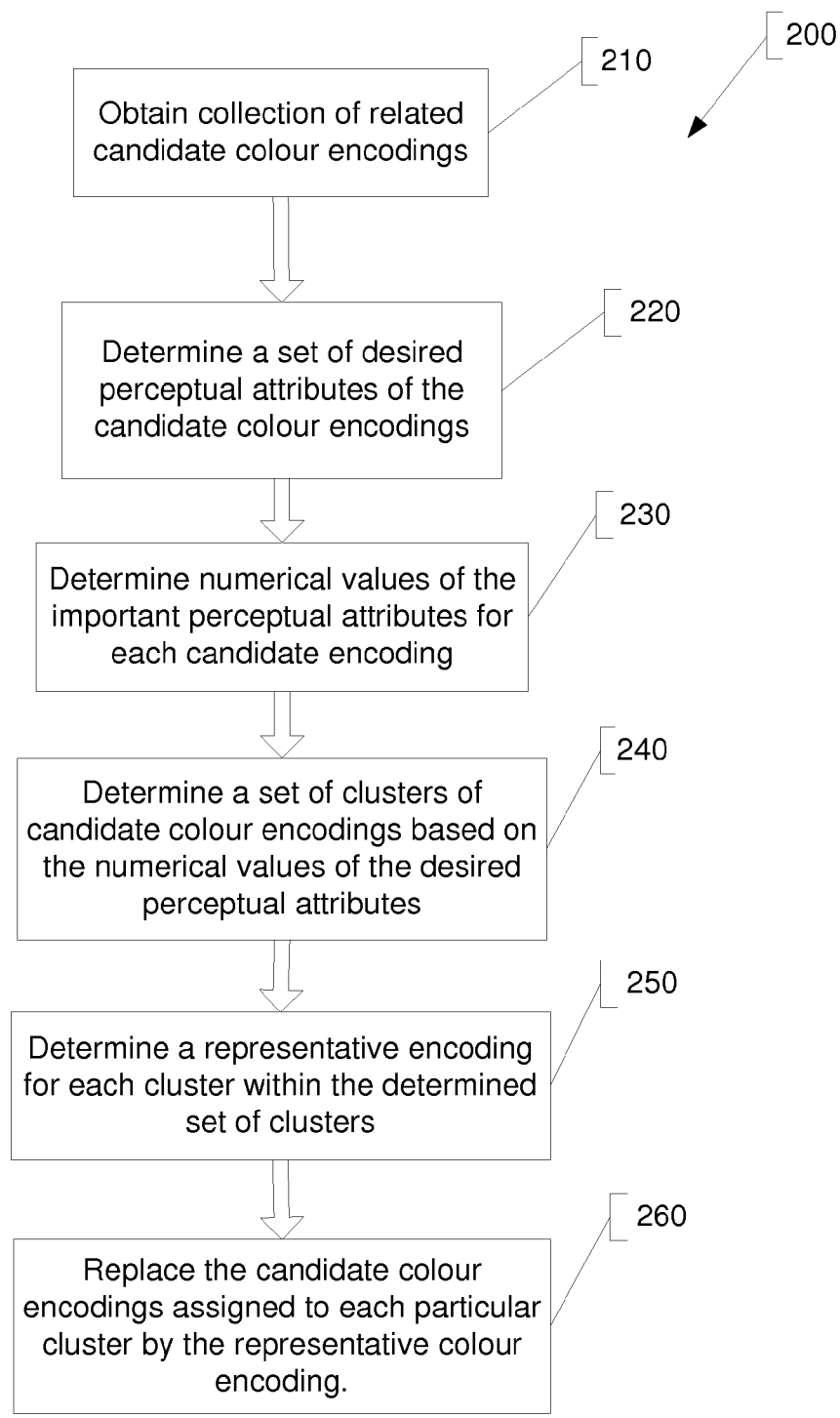
FIG. 2 is a schematic flow diagram showing a method of determining a representative colour encoding.

The method 200 of determining a representative colour encoding, will now be described with particular reference to FIG. 2. The method 200 uses colour encoding clustering. The method 200 may be implemented as one or more software code modules of the software application 133 resident on the hard disk drive and being controlled in its execution by the processor 105.

The method 200 begins at collection step 210, where the processor 105 performs the step of obtaining a collection or set of related candidate colour encodings. The set of related colour encodings may be obtained, for example, from a digital document file 190 stored in the memory 106 or hard disk drive. Alternatively, the set of related colour encodings may be accessed by the computer module 101, via the network 120, for example from a digital document file 190 or the like stored on a remote server connected to the network 120.

The set of candidate colour encodings contains a plurality of candidate encodings related such that the encodings use identical ranges of encoded values and the same number of channels. For example, the set of candidate colour encodings may contain a collection of 3-channel, additive 8-bit encodings. Such a collection of 3-channel, additive 8-bit encodings may be readily clustered. However, a mixture of 8-bit 3-channel additive encodings and 16-bit 4-channel subtractive encodings may not result in a sensible cluster.

In an attribute-determining step 220, the processor 105 performs the step of determining a set of one or more desired perceptual attributes of the candidate colour encodings. The desired perceptual attributes form the basis upon which the obtained candidate colour encodings will be clustered. The desired perceptual attributes includes, for example, at least one of the white point of each of the candidate colour encodings, a method in which neutral colours are treated by each of the candidate colour encoding, a gamut volume or shape of each of the candidate colour encodings or properties of the primaries or colourants that define each of the candidate colour encodings. As described below, the desired perceptual attributes of the candidate colour encodings may also include chromaticities of primaries of the encodings, neutral contrast and neutral scale chromaticity of the encodings. The determined desired perceptual attributes may be stored by the processor 105, for example, in the memory 106 or hard disk drive 110. Step 220 will be described in further detail below.

In a value-determining step 230, the processor 105 performs the step of determining a set of numerical values for the desired perceptual attributes determined in the property-determining step 120. The numerical values are determined in a manner depending on specific perceptual attributes to which the numerical values relate. The determined set of numerical values may be stored in memory 106 or the hard disk drive 110. Step 230 will be described in more detail below.

The method 200 continues at a cluster-determining step 240, where the processor 105 performs the step of determining a set of colour encoding clusters based on a clustering criterion related to the determined one or more desired perceptual attributes of the candidate colour encodings. The determined numerical values of the desired perceptual attributes are used as a basis for determining the set of colour encoding clusters of the candidate colour encodings. The set of colour encoding clusters determined at step 240 may be stored in the memory 106 or the hard disk drive 110.

Also at step 240, the processor 105 performs the sub-step of assigning each candidate colour encoding to one cluster within the set of colour encoding clusters. Step 240 will be described below in further detail. In particular, a method 600 of clustering colour encodings, which may be executed at step 240 in one implementation, will be described with reference to FIG. 6.

At representative-encoding step 250, the processor 105 performs the step of determining a representative colour encoding for each cluster within the determined set of colour encoding clusters depending on the candidate colour encodings assigned to each cluster. The determined representative colour encoding may be stored in the memory 106 or hard disk drive 110 by the processor 105. There are a number of methods for determining the representative colour encoding at step 250. For example, the representative colour encoding determined for a particular cluster represents an average of the candidate colour encodings assigned to the cluster. The representative colour encoding determined for a particular cluster may alternately be configured to have desired perceptual attributes matching the perceptual attributes corresponding to a centroid of the cluster. Step 250 will be described in further detail below.

The method 200 concludes at a replacing step 260, where the processor 105 performs the step of replacing the candidate colour encodings assigned to each particular cluster, stored in the memory 206, by the representative colour encoding determined for that particular cluster. Step 260 will be further described below with reference to FIG. 8.

In one implementation, as described herein, the set of candidate colour encodings obtained in step 210 is a set of additive colour encodings. Additive colour encodings are very widespread in their use. Additive colour encodings are used to encode colours on additive devices such as displays and monitors. Furthermore, additive colour encodings such as sRGB, Adobe Wide Gamut RGB and ProPhoto RGB have been widely adopted as standard methods for exchanging colour information over the Internet and for photographic image encoding. The properties of additive colour encodings are described in further detail below.

As described above, in the attribute-determining step 220 of the method 200, a set of one or more desired perceptual attributes of the candidate colour encodings is determined. The desired perceptual attributes have a significant impact on perception of colours represented using the candidate colour encodings. As an example, one desired perceptual attribute that is determined at step 220 is the white point of each of the candidate colour encodings. The white point defines the intended state of chromatic adaptation of an observer of colours. The white point of a candidate colour encoding is expressed as a set of CIE XYZ colorimetry values with the Y value set to a value of exactly one (1.00). Since white points have the same Y value (i.e., 1.00) then two chromaticity values are needed to numerically represent the white point of a candidate colour encoding.

In one implementation, the cluster encodings are based on the desired perceptual attributes, and CIE XYZ are linear with radiance rather than perception. In this instance, the CIE XYZ of the white point is transformed to a perceptually uniform representation such as CIELab. Since all white points have a fixed value of Y and L* is a function only of Y then a* and b* values of the white point is an appropriate set of desired perceptual attributes of the candidate colour encoding.

The tristimulus values of the primaries used in an additive colour encoding also have an influence on the relationship between the encoded colour values of a colour and the perception of that colour. Therefore, a second set of desired perceptual attributes on which the candidate colour encodings may be clustered is the tristimulus values of the primaries. The full set of three tristimulus values for each primary is not needed for clustering the additive colour encoding since the ratio of radiometric intensities of the primaries is established by the white point of a candidate colour encoding. Accordingly, the candidate colour encodings may be clustered at step 240 based on the chromatic attributes of the primaries of each candidate colour encoding. The chromatic attributes of the primaries may be expressed in an approximately perpetually uniform way by using 'a*' and 'b*' colour coordinates from the CIELab values of the primaries. An alternative colour space, in which the chromatic attributes of the primaries may be expressed in an approximately perceptually uniform manner, is to use the CIE 1976 u',v' uniform chromaticity scale.

The chromaticities of the primaries are desired perceptual attributes, since the chromaticities of the primaries control the colour gamut of a colour encoding. As such, the chromaticities of the primaries of a candidate colour encoding determine the relationship between a numerical colour description used by a colour encoding and perceived chroma of a corresponding colour.

A further set of desired perceptual attributes that may be determined at step 220 is the method by which colours with equal-valued components are rendered by a particular colour encoding. The majority of additive colour encodings are defined in such a way that perceptually neutral colours are defined with equal encoded RGB values (i.e. colours encoded such that R=G=B). All colours satisfying such a condition are referred to below as neutral scale colours, since the condition substantially defines a greyscale. Therefore, a set of desired perceptual attributes that may be determined for an additive colour encoding at step 220 may be determined from characteristics of rendering of neutral scale colours.

There are many other potential desired perceptual attributes that may be determined at step 220 together with or in place of the desired perceptual attributes described above. However, for ease of explanation, a small number of attributes have been described as the desired perceptual attributes for implementing the method 200. However, the small number of attributes described is not intended to imply a limitation on the number of attributes that may be selected, determined or used in the method 200. In this connection, there are no restrictions on the attributes that may be selected, determined or used in the method 200.

Figure 3:
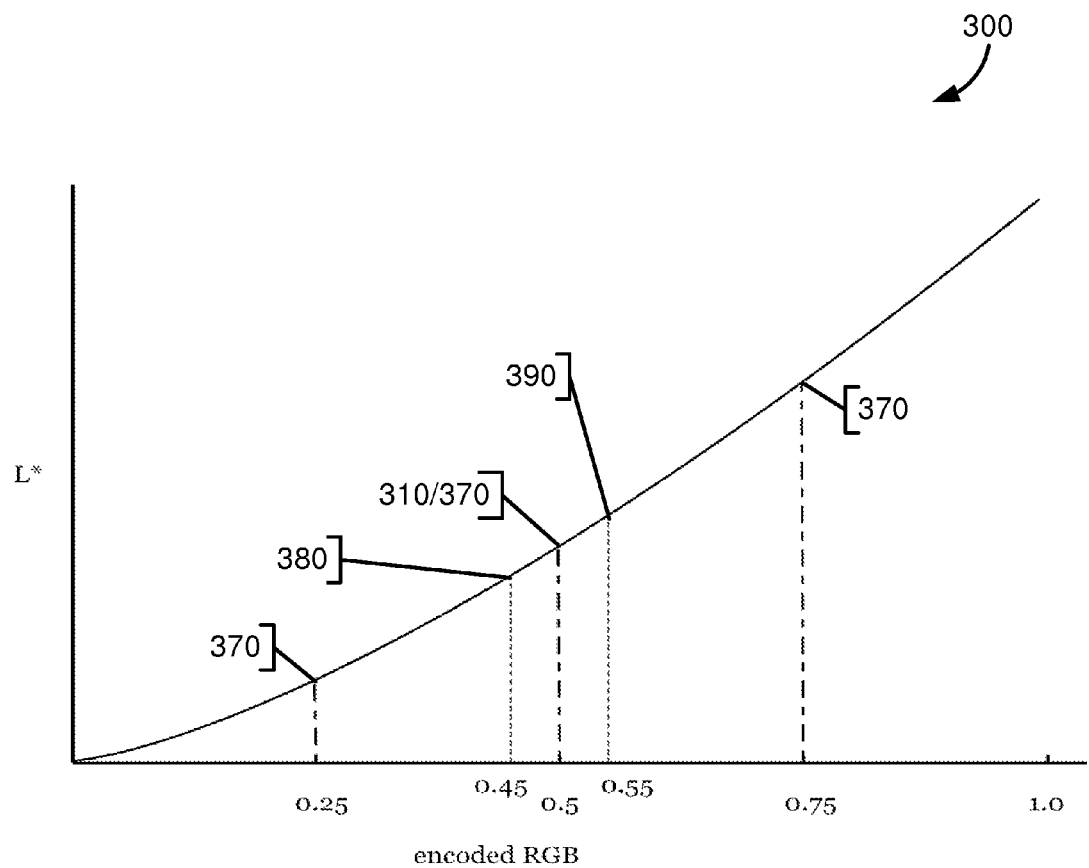
FIG. 3 is a graph showing encoded RGB values versus luminance $L^*$.

In one implementation, the desired perceptual attributes of neutral scale colours that are determined at step 220 are average lightness contrast at the centre point of a neutral scale and chromaticities of three neutral scale colours spaced along the neutral scale. In this instance, three points of the neutral scale that are determined are the 25%, 50% and 75% points of the neutral scale 370. The 25%, 50% and 75% points 370 were selected arbitrarily and other points may be selected without loss of validity. The selection of attributes related to neutral scale colours is based on nature of the candidate colour encodings and eventual use of the clusters of candidate colour encodings "Lightness contrast" may be quantified as the change in the CIELab L* value corresponding to a specified change in input RGB values. The chromaticities at the three points 370 on the neutral scale (or greyscale) of FIG. 3 may be quantified using the a* and b* CIELab values of the neutral scale colours produced. For any colour encoding that is defined such that equal encoded RGB values produce a perceptually neutral colour, the a* and b* values will be exactly zero, but for additive encodings not so defined, finite non-zero values will result.

The numerical values of the desired perceptual attributes determined for each candidate colour encoding at step 230 depend on the attributes of the candidate colour encodings. In one implementation, the numerical values for additive colour encodings, such as the CalRGB encodings, may be determined at step 230 in accordance with Equations [1] and [2] above. After the desired perceptual attributes are determined in attribute determining step 220, the values for each of the attributes are determined at value determining step 230.

In one implementation, numerical values of adaptive white point of the candidate colour encodings are determined at step 230. In an additive colour encoding, the white point is determined when each of the primaries is set to maximum output, in accordance with Equation [5] below.

$$\begin{bmatrix} X_W \\ Y_W \\ Z_W \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} 1 \\ 1 \\ 1 \end{bmatrix} = \begin{bmatrix} k_R X_R & k_G X_G & k_B X_B \\ k_R Y_R & k_G Y_G & k_B Y_B \\ k_R Z_R & k_G Z_G & k_B Z_B \end{bmatrix} \begin{bmatrix} 1 \\ 1 \\ 1 \end{bmatrix} \quad [5]$$

$$\Rightarrow \begin{bmatrix} X_W \\ Y_W \\ Z_W \end{bmatrix} = \begin{bmatrix} a_{11} + a_{12} + a_{13} \\ a_{21} + a_{22} + a_{23} \\ a_{31} + a_{32} + a_{33} \end{bmatrix} = \begin{bmatrix} k_R X_R + k_G X_G + k_B X_B \\ k_R Y_R + k_G Y_G + k_B Y_B \\ k_R Z_R + k_G Z_G + k_B Z_B \end{bmatrix}$$

In Equation [5], $X_W$, $Y_W$ and $Z_W$ are the CIE XYZ tristimulus values of the white point of a colour encoding. The white points of each of the colour encodings of a cluster of candidate colour encodings are compared under identical conditions. Accordingly, the conditions for comparison of the white points are defined prior to making the comparison. The conditions for comparison of the white points may be determined by considering how the clustered candidate colour encodings will be used. For example, in the case of a printing workflow, the standard viewing environment for print viewing specifies a D50 illuminant. D50 is a standard illuminant designed to approximate the spectrum of daylight with a correlated colour temperature of about 5000 Kelvin. Accordingly, for such an application, the white points of the candidate colour encodings may be compared in a standard D50 environment. To compare the candidate colour encodings in a standard D50 environment, the apparent colour of each illuminant as the illuminant would appear to an observer adapted to D50 is determined Subsequently, step 240 may be considerably simplified if the numerical values of desired perceptual attributes are represented in a perceptually uniform colour space. Accordingly, the white point tristimulus values, [$X'_W$, $Y'_W$, $Z'_W$], may be transformed to a perceptually uniform colour space such as CIELab, CIELuv, IPT or any other suitable colour space or colour appearance space. In one implementation, the white point tristimulus values, [$X'_W$, $Y'_W$, $Z'_W$], may be transformed to CIELab colour space. Additionally, if all colour encoding white points are defined to have a $Y'_W$ value of exactly one (1.0) and, hence a CIELab L* value of exactly one hundred (100), then the chromatic components (i.e., the CIELab a* and b* values) of the colour encoding white point may be used to cluster the candidate colour encodings at step 240.

In one implementation, the chromaticities of the primaries of the candidate colour encodings are determined at step 230 as the numerical values. In an additive colour encoding, the tristimulus values of each primary are obtained when each of the required primaries is set to a maximum output and the other primaries are set to zero output, as shown in Equation [6] below.

$$\begin{bmatrix} X_R \\ Y_R \\ Z_R \end{bmatrix} == \begin{bmatrix} a_{11} & a_{12} & a_{13} \\ a_{21} & a_{22} & a_{23} \\ a_{31} & a_{32} & a_{33} \end{bmatrix} \begin{bmatrix} 1 \\ 0 \\ 0 \end{bmatrix} = \begin{bmatrix} a_{11} \\ a_{21} \\ a_{31} \end{bmatrix}$$

$$\begin{bmatrix} X_G \\ Y_G \\ Z_G \end{bmatrix} == \begin{bmatrix} a_{11} & a_{12} & a_{13} \\ a_{21} & a_{22} & a_{23} \\ a_{31} & a_{32} & a_{33} \end{bmatrix} \begin{bmatrix} 0 \\ 1 \\ 0 \end{bmatrix} = \begin{bmatrix} a_{12} \\ a_{22} \\ a_{32} \end{bmatrix}$$

$$\begin{bmatrix} X_B \\ Y_B \\ Z_B \end{bmatrix} == \begin{bmatrix} a_{11} & a_{12} & a_{13} \\ a_{21} & a_{22} & a_{23} \\ a_{31} & a_{32} & a_{33} \end{bmatrix} \begin{bmatrix} 0 \\ 0 \\ 1 \end{bmatrix} = \begin{bmatrix} a_{13} \\ a_{23} \\ a_{33} \end{bmatrix}$$ [6]

To determine the chromaticities of the primaries of the candidate colour encodings, the tristimulus values of the primaries are mapped to a perceptually uniform colour space like the colour space in which the white point of a particular colour encoding may be represented. In one implementation, the chromaticities of the primaries are represented as a* and b* coordinates of the CIELab colour space. In this instance, in converting the tristimulus values to CIELab, the white point of each colour encoding is used as a reference white for determining the chromaticities of the primaries. There is no need to use the luminance L* value for the primaries as one of the desired perceptual attributes since the relative luminances of the three primaries in an additive colour encoding is fully determined by the chromaticities of the primaries and the white point of the colour encoding.

As described above, in one implementation, values for the desired perceptual attributes of neutral scale colours are determined at step 230. Neutral scale colours will now be described in more detail with reference to FIG. 3. At step 220, the desired perceptual attributes of neutral scale colours are determined based on the average lightness contrast at the centre point of the neutral scale and the chromaticities of three neutral scale colours 170 spaced along the neutral scale. These three points are typically the 25%, 50% and 75% points of the neutral scale. Accordingly in the example of FIG. 3, the center point 310 corresponds to one of the points 370.

The average lightness contrast may be determined using Equations [1] and [2] to determine $[XYZ]_{0.45}$ and $[XYZ]_{0.55}$, which are the CIE XYZ tristimulus values corresponding to [R G B]=[0.45 0.45 0.45] and [R G B]=[0.55 0.55 0.55], respectively. The tristimulus values, $[XYZ]_{0.45}$ and $[XYZ]_{0.55}$, are shown at 380 and 390, respectively, in FIG. 3. The tristimulus values $[XYZ]_{0.45}$ and $[XYZ]_{0.55}$, are converted into CIELab values to determine $[L^* a^* b^*]_{0.45}$ and $[L^* a^* b^*]_{0.55}$, respectively. In the conversion to CIELab, a single common reference white is the white point of a candidate colour encoding.

Alternatively, the resulting CIE XYZ tristimulus values for each candidate colour encoding is converted to a set of corresponding colorimetry values, under a single illuminant such as D50, using a chromatic adaptation transform such as von Kries or the Bradford transform.

A measure of the midscale lightness contrast may be determined by subtracting the two resulting L* values and applying an appropriate scaling, in accordance with Equation [7], below. The reason for the scaling being applied is described below.

$$C_{L^*} = k_p(L^*_{0.55} - L^*_{0.45})$$ [7]

In Equation [7], $C_{L^*}$ represents lightness contrast and $k_p$ is a perceptual scaling constant described below in relation to step 140.

Determining the chromaticities of three neutral scale colours spaced along the neutral scale may also be accomplished using Equations [1] and [2] and using RGB triple values of [0.25, 0.25, 0.25], [0.50, 0.50, 0.50] and [0.75, 0.75, 0.75] respectively for the 25%, 50% and 75% points of the neutral scale. In this instance, three sets of CIE XYZ values are determined. The three sets of CIE XYZ values may be converted to a set of corresponding colorimetry values, under a single illuminant such as D50, before being converted into a perceptually uniform colour space.

As described above, at the cluster-determining step 240, the processor 105 determines a set of colour encoding clusters from the candidate colour encodings obtained at step 210, and stores the set of colour encoding clusters in the memory 106 or hard disk drive 110. The clusters of candidate colour encodings may be determined at step 240 in accordance with a number of methods, two of which will be described below by way of example. The two methods for determining the clusters of candidate colour encodings at step 240 will be referred to as 'single-step' clustering and 'successive clustering', respectively. Accordingly, in one implementation, the set of colour encoding clusters is derived using a single-step clustering method. And in another implementation, the set of colour encoding clusters is derived using a successive clustering method. The method 600 described below is a successive clustering method. Two examples of clustering methods that may be used at step 240 are referred to as the "k-means clustering method" and the "hierarchical clustering method".

In the single-step clustering method described herein, the candidate colour encodings are clustered using a single clustering operation based on a (high) dimensional space. In this instance, the numerical values associated with the desired perceptual attributes of the candidate colour encodings may be included in a particular cluster of candidate colour encodings.

Figure 4:
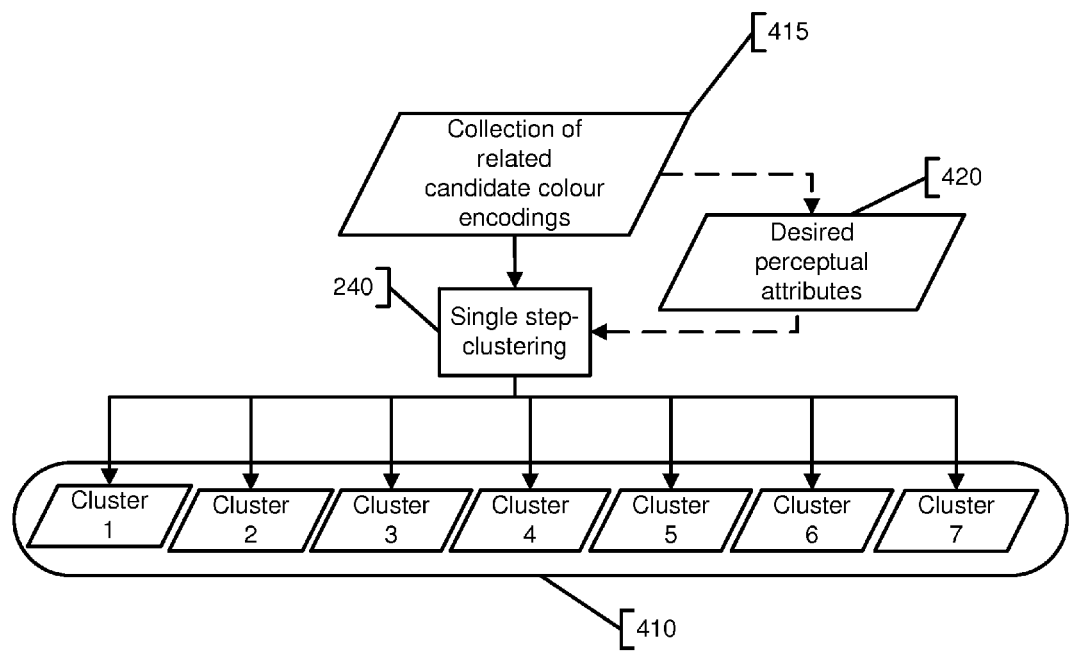
FIG. 4 shows a final set of colour encodings clustered using single-step clustering.

As an example, FIG. 4 shows a final set of clusters 410, labelled "Cluster 1" to "Cluster 7", of colour encodings generated in a single clustering operation at step 240. In the example of FIG. 4, step 240 uses desired perceptual attributes 420 (as determined at step 220) as a basis for a clustering criterion 210 in order to cluster the candidate colour encodings 415. Preferably, the desired perceptual attributes 420 determined at step 220 are represented using numerical scales for which a unit value change in any of the desired perceptual attributes corresponds to the same degree of perceptual change.

It is possible to cluster the candidate colour encodings if the desired perceptual attributes do not have equivalent perceptual scaling. However, in this instance, a significantly higher degree of complexity in distance metrics on which the clustering is based is required.

Using single-step clustering, the clusters of candidate colour encodings are created in a single clustering operation at step 240. The clustering criterion 210 includes contributions from the desired perceptual attributes determined at step 220. The clustering operation performed at step 240 may utilise any clustering method including hierarchical clustering and partitional clustering (e.g. k-means clustering). Accordingly, in one implementation, the set of colour encodings is determined at step 240 using partitional clustering. And in another implementation, the set of colour encodings is determined at step 240 using hierarchical clustering. Alternatively, the clustering operation performed at step 240 may use other clustering methods such as Gaussian mixture models and spectral clustering methods. The clustering method selected to perform step 240 depends upon a clustering objective.

Hierarchical clustering does not require that the number of clusters created be fixed. For example, if it is desired that the candidate colour encodings be clustered into a defined and fixed number of clusters (or groups), regardless of the eventual distance from any cluster of candidate colour encodings to the centroid of that cluster, then the k-means or a similar partitional clustering method may be used at step 240. In contrast, if it is required that the distance from any cluster of candidate colour encodings to the centroid of the cluster be less than a defined fixed tolerance, for example, and the number of clusters of colour encodings is not limited, then hierarchical clustering may be used at step 240.

In another example, if it is desired that there be a very high degree of perceptual similarity between members of a cluster of candidate colour encodings then a perceptual tolerance may be established for the maximum distance from any candidate colour encoding to the centroid of that candidate colour. In this instance, hierarchical clustering is used to determine the required number of clusters.

The above described examples show the applicability of hierarchical and partitional clustering methods to clustering the candidate colour encodings at step 240. However, other clustering methods may be used to achieve the same or different clustering objectives as those described with reference to the above examples.

Figure 5:
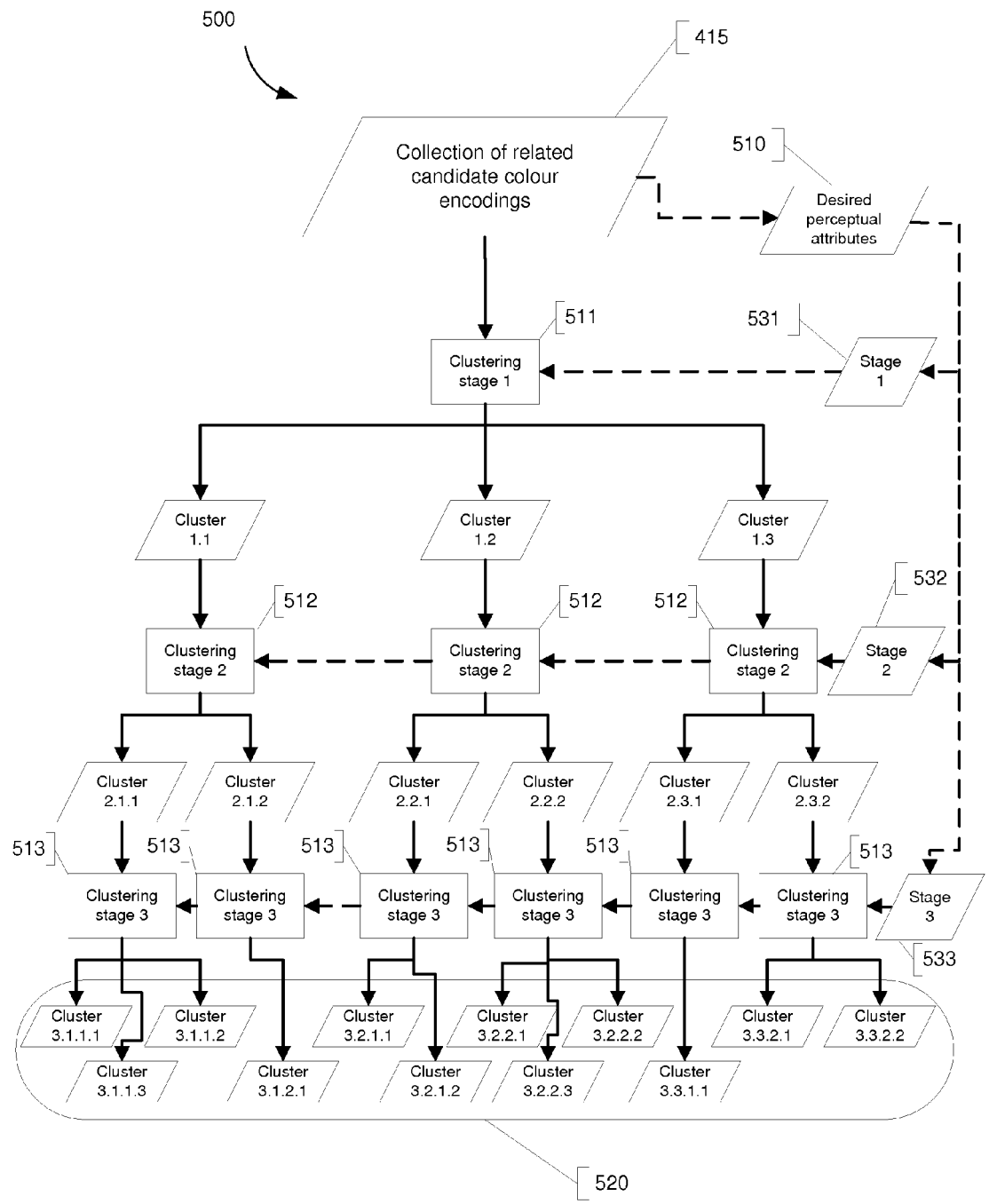
FIG. 5 shows a final set of colour encodings clustered using successive clustering.

Another implementation of step 240 will be described with reference to FIG. 5, in which the successive-clustering method 600 is used to cluster the candidate colour encodings 415. In the successive-clustering method 600 there are multiple stages of clustering 511, 512 and 513. As seen in FIG. 5, each stage (e.g., 511) of the multi-stage clustering is represented by terms 'Clustering stage' followed by a number indicating a stage. For example, 'Clustering stage 2' 512 indicates a second stage of clustering in accordance with a tree-type structure 500 shown in FIG. 5. Further, intermediate sub-stages of a clustering stage are indicated, in FIG. 5, by a dot separated number. For example, 'Cluster 2.3.1' represents a first (from the numeral 1 (one)) intermediate sub-cluster at a current stage (e.g., 512) that originated from a third (from the numeral 3 (three)) sub-cluster of the previous stage (e.g., 511), the current stage 512 being stage 2.

At each stage 511, 512 and 513 a subset 531, 532 and 533 of the desired perceptual attributes 415 are used as the criteria for the clustering operation. Successive-clustering provides some added flexibility in that a different clustering method or tolerance may be used in the each of the various clustering stages 511, 512 and 513. Additionally, at each stage 511, 512 and 513, the set of candidate colour encodings 415 is assigned to a new collection of clusters but these collections of colour encoding clusters are related by the tree-type structure 500.

Having determined a set of clusters of candidate colour encodings, in representative-encoding step 250 of the method 200, the processor 105 performs the step of determining a representative colour encoding for each cluster within the determined set of colour encoding clusters depending on the candidate colour encodings assigned to each cluster. In one implementation, a single representative colour encoding, corresponding to a representative location of a cluster, is determined for each cluster.

At the conclusion of step 240, each cluster is represented by a centre point corresponding to particular values of a data set on which the clustering was performed at step 240. The representative encoding for a cluster of colour encodings is preferably representative of all members of the particular cluster. For example, performance of the representative colour encoding for a cluster of colour encodings is an average of the performances of the colour encodings for the cluster, where performance refers to the colour reproduction on a page using either the representative colour encoding or the colour encodings for the cluster.

The representative colour encoding for a cluster may also represent the centroid of the cluster. In this instance, the centroid of a cluster is expressed as a data vector representing the desired perceptual attributes (as determined at step 220) of the representative colour encoding that would lie at the centroid. Thus, the centroid has a white point, a set of primary chromaticities and a set of values for the desired perceptual attributes of neutral scale colours. The white point chromaticities and primary chromaticities provide sufficient information to enable determination of a matrix (see Equation [1]) corresponding to the representative colour encoding. Further, data for the desired perceptual attributes of neutral scale colours allows estimation of the encoding functions, $f_P(P)$. In one implementation, the centroid data for the neutral scale colours consists of seven values, and some constraints need to be used in determining the encoding function corresponding to the centroid. The constraints may include an assumption of the general form of the encoding function, such as a general form of the encoding function being a simple exponential or a polynomial of a defined polynomial degree. The constraints may also include a set of constraints such as boundary values (e.g., output of the encoding function must lie between 0 and 1). The constraints may also include slope constraints or monotonicity constraints (e.g., if the input value increases, it is expected that the output value will also increase). Any suitable method for estimating the functional form of a function from sampled data points may be used in the described methods.

In the replacing step 260, the processor 105 performs the step of replacing the candidate colour encodings assigned to each particular cluster by the representative colour encoding determined for that particular cluster. As described above, the representative colour encoding may be stored in the memory 106 or hard disk drive 110. The representative colour encoding determined in the representative-encoding step 250 may be used as a substitute (or replacement) for the entire candidate colour encodings assigned to a cluster for which the representative encoding was determined.

As described above, the set of clusters of candidate colour encodings is determined at step 240 using either a single-step clustering method or a successive clustering method. In relative terms, the single step clustering method is less complex and the successive clustering method is more complex. However, each clustering method comes with its own advantages.

Figure 6:
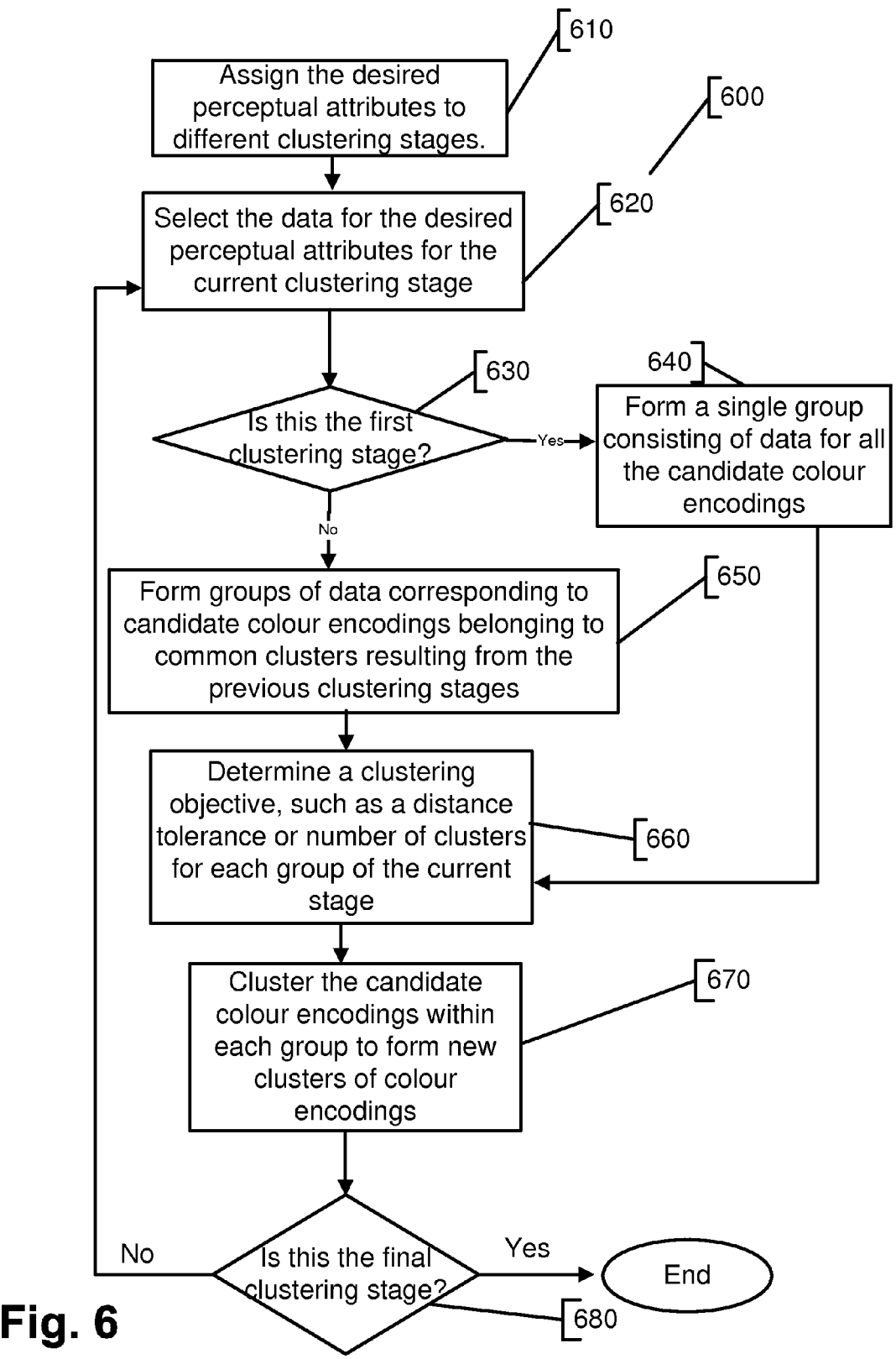
FIG. 6 is a flow diagram showing a method of clustering colour encodings, as executed in the method of FIG. 2.

The method 600 of clustering colour encodings, which may be executed at step 240 in one implementation, will now be described with reference to FIGS. 5 and 6.

The method 600 is a successive clustering method. The method 600 may be implemented as one or more software code modules of the software application program 133 resident on the hard disk drive 110 and being controlled in its execution by the processor 105.

The successive clustering method 600 begins at assignment step 610, where the processor 105 performs the step of assigning desired perceptual attributes 510 determined at step 230 to the different proposed clustering stages 511, 512 and 513. The desired perceptual attributes 510 may be accessed by the processor 105 at step 240 from the memory 206 or hard disk drive 110. In the example of FIG. 5, a set of desired perceptual attributes 531 has been assigned to "stage 1" 511, a set of desired perceptual attributes 532 has been assigned to "stage 2" 512 and a set of desired perceptual attributes 533 has been assigned to "stage 3" 511. The white point of a colour encoding is considered to have the greatest impact on the colour encoding and accordingly may be used as a sole clustering criterion for the first clustering stage 511. In one implementation, the desired perceptual attributes used for the second stage 532 of clustering are the chromaticities of the primaries of the additive colour encodings. The desired perceptual attributes impact the chromaticity gamut of a colour encoding and hence affect the relationship between numerical encoding values and the perceptual colour corresponding to the numerical values. In the example of FIG. 5, the desired perceptual attributes 533 used at the third stage 513 of clustering are the attributes of neutral scale colours comprising average lightness contrast at the centre point of the neutral scale and the chromaticities of three neutral scale colours spaced along the neutral scale. The desired perceptual attributes 533 related to neutral scale colours in the example differ fundamentally from the desired perceptual attributes 531 and 532 used for the first two stages 511 and 512, respectively, of successive clustering described above with reference to FIG. 5. In additive colour encodings, which may all be represented using Equation [1] described above, the encoding white point and the chromaticities of the encoding primaries are dependent only on the matrix used in Equation [1]. The attributes of the neutral scale colours, on the other hand, are dependent on both the encoding functions, $f_P(P)$, as well as the matrix of Equation [1].

In a selection step 520, the processor 105 performs the step of selecting data for the desired perceptual attributes of the current clustering stage. The selected data may be stored in the memory 106. In the example of FIG. 5, the first clustering stage 511 uses the encoding white point chromaticity data, which can be represented as vectors in a two-dimensional space. The second clustering stage 512 uses chromaticity data for the primaries of the colour encoding. Since there are three colour primaries for any additive colour encoding, and two values are required to describe the chromaticity coordinates of each primary, the primary chromaticity data for each candidate colour encoding is represented as a vector in six dimensions. The third stage 513 of clustering in the example of FIG. 5 uses data pertaining to desired perceptual attributes of neutral scale colours. The data may be represented as a vector in a seven dimensional space—one dimension for average lightness contrast at the centre point of the neutral scale and the chromaticities of three neutral scale colours spaced along the neutral scale.

In a stage-determining step 630, if the processor 105 determines that the first stage 511 of clustering is being executed, then the method 600 proceeds to single-group formation step 440. Otherwise, the method 600 proceeds to step 650.

In step 640, the processor 105 performs the step of placing all the candidate colour encodings 415 in a single group for clustering. In particular, the processor 105 performs a single clustering operation utilizing data from all the candidate colour encodings in the set 415. The single group determined at step 640 may be stored in the memory 106 or the hard disk drive 110. Following step 640, the method 600 proceeds to step 660.

As described above, if the processor 105 determines at step 630 that the current clustering stage is not the first stage, then the method 600 proceeds to a multi-group formation step 650. At the multi-group formation step 650, the processor 105 performs the step of forming separate groups of clustering data, where each group corresponds to colour encodings belonging to common clusters resulting from the previous clustering stages (e.g., 511). The groups of clustering data formed at step 650 may be stored in the memory 106 or the hard disk drive 110. The number of data groups required at step 650 is equal to the number of encoding clusters formed at the conclusion of the previous clustering stage.

At a cluster-objective step 660, the processor 105 performs the step of determining a clustering objective for the current clustering stage. The clustering objective depends on the clustering method to be used. If a k-means or similar partitional clustering method is used, the clustering objective may be based on the number of clusters desired. On the other hand, if a hierarchical clustering method is used the clustering objective may be a distance tolerance as described above. In the case of clustering stages 512 and 513 after the first stage 511, multiple clustering operations may be needed, with each stage 512 and 513 having a corresponding clustering objective.

The clustering objective and how the objective is determined for the method 600 will now be described in detail.

Figure 7:
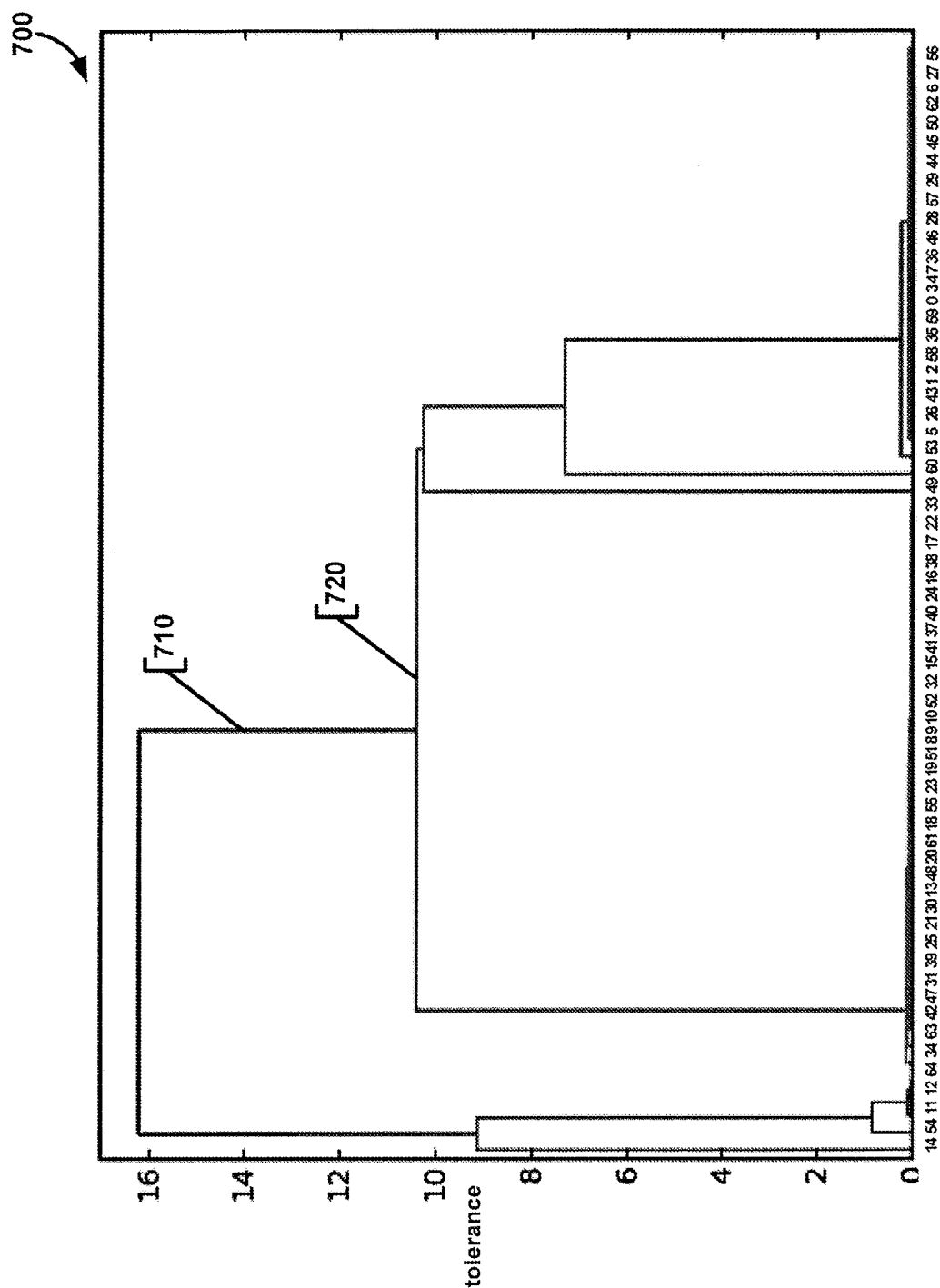
FIG. 7 shows a dendrogram obtained from a hierarchical clustering operation.

As described above, the white point of a colour encoding is considered to have the greatest impact on the colour encoding. Accordingly, a small tolerance parameter value is used with a hierarchical clustering operation. The relationship between the tolerance parameter value and the number of clusters resulting from a hierarchical clustering operation is shown in a dendrogram 700 shown in FIG. 7. In the dendrogram 700 of FIG. 7, the ordinate is the tolerance parameter value and the abscissa represents an index of the candidate colour encodings 415. Vertical lines (e.g., 710) on the dendrogram 700 indicate a colour encoding cluster while horizontal lines (e.g., 720) span candidate colour encodings belonging to the cluster. FIG. 7 shows that as the tolerance is reduced the number of resulting clusters increases.

In the second stage 512 of the example of FIG. 5, clustering is based on the chromaticities of the primaries of the additive colour encodings. The chromaticities of the primaries of the additive colour encodings are less critical perceptual parameter values than the encoding white point and so a larger tolerance value is acceptable. However, the third clustering stage 513 in the example of FIG. 5 is based on desired perceptual attributes related to neutral scale colours. Neutral scale colours are frequently very important in colour printing and display applications and in the example of FIG. 5 a tight clustering tolerance is used to reflect such importance.

The method 600 continues at cluster-in-group step 670, where the processor 105 performs a clustering operation within each group of the current clustering stage to determine the set of colour encoding clusters. The set of colour encoding clusters determined at step 670 may be stored in memory 106 or the hard disk drive 110. The number of clustering operations required at any stage is equal to the number of clusters resulting from previous clustering stages.

In a final-stage check step 680, if the processor 105 determines that the just completed clustering stage is the final clustering stage, then the method 600 concludes. In this instance, the clusters of candidate colour encodings determined at step 670 represent a final set of clusters 520 of the candidate colour encodings as shown in FIG. 5. Otherwise, if the processor 105 determines that further clustering stages are required then the method 600 returns to step 620 and the steps described above are repeated.

The replacing step 260 of the method 600 will now be further described by way of example with reference to FIG. 8. As described above, in replacing step 160, the processor 105 performs the step of replacing the candidate colour encodings assigned to each particular cluster stored with the memory 106 or hard disk drive 110 by the representative colour encoding determined for that particular cluster. FIG. 8 shows an example of colour encodings (e.g., 810) in a single cluster selected from the final set of clusters of colour encodings (e.g., 520). The encodings (e.g., 810) in table 800 are gamma colour encoding parameters from a selected set of PDF documents encoded according to the CalRGB family of colour encodings. The gamma colour encodings are the parameters which are grouped into clusters for the third stage 513 clustering, since the desired perceptual attributes related to neutral scale colours are dependent on the encoding functions $f_P(P)$ (see Equation [2]).

Selected final cluster in the example of FIG. 8 contains a total of sixty-four (64) gamma colour encodings, of which there are eight (8) unique gamma colour encodings (e.g., 810). The unique gamma colour encodings (e.g., 810) span a range of values from 1.76999 to 1.800999 in the example of FIG. 8. The gamma colour encoding values (e.g., 810) of FIG. 8 are replaced by a representative cluster gamma colour encoding value 830 in the replacing step 260.

In the example of FIG. 8, the selected final (third stage 513) cluster 811 falls within a second stage cluster, for which the selected desired perceptual attributes for clustering are the chromaticity values for the primaries of the colour encoding. In the example of FIG. 8, a single representative matrix encoding replaces seventy-four (74) matrix encodings within the second stage cluster, of which there are twenty-four (24) unique sets of primary chromaticity co-ordinates.

Further arrangements, referred to as Representative Colour Encoding Replacement (RCER) arrangements, will now be disclosed, which seek to address the problems described in the background material by selecting a predetermined colour transform for use in place of a newly generated colour transform, under conditions where any resulting colour error will be limited to levels with colour errors acceptable to most human observers. The selected colour transform is used to colour convert an image from an input colour encoding to an output colour encoding (representative colour encoding).

Figure 9:
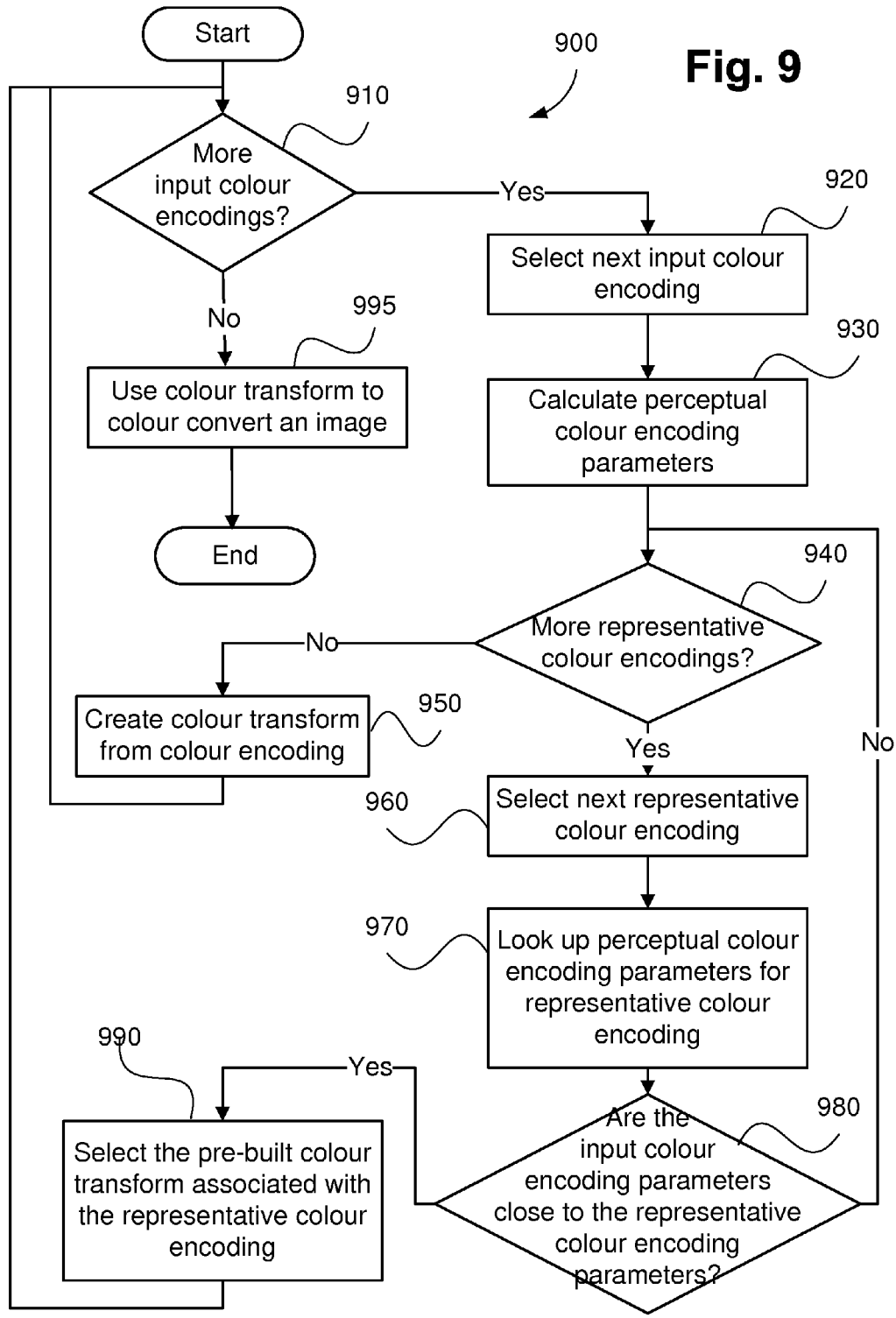
FIG. 9 is a flow diagram of a process performed by the colour transform generator of FIG. 11 for selecting colour transforms according to one Representative Colour Encoding Replacement (RCER) arrangement and using a selected colour transform to colour convert an image from an input colour encoding to an output colour encoding.
Figure 10:
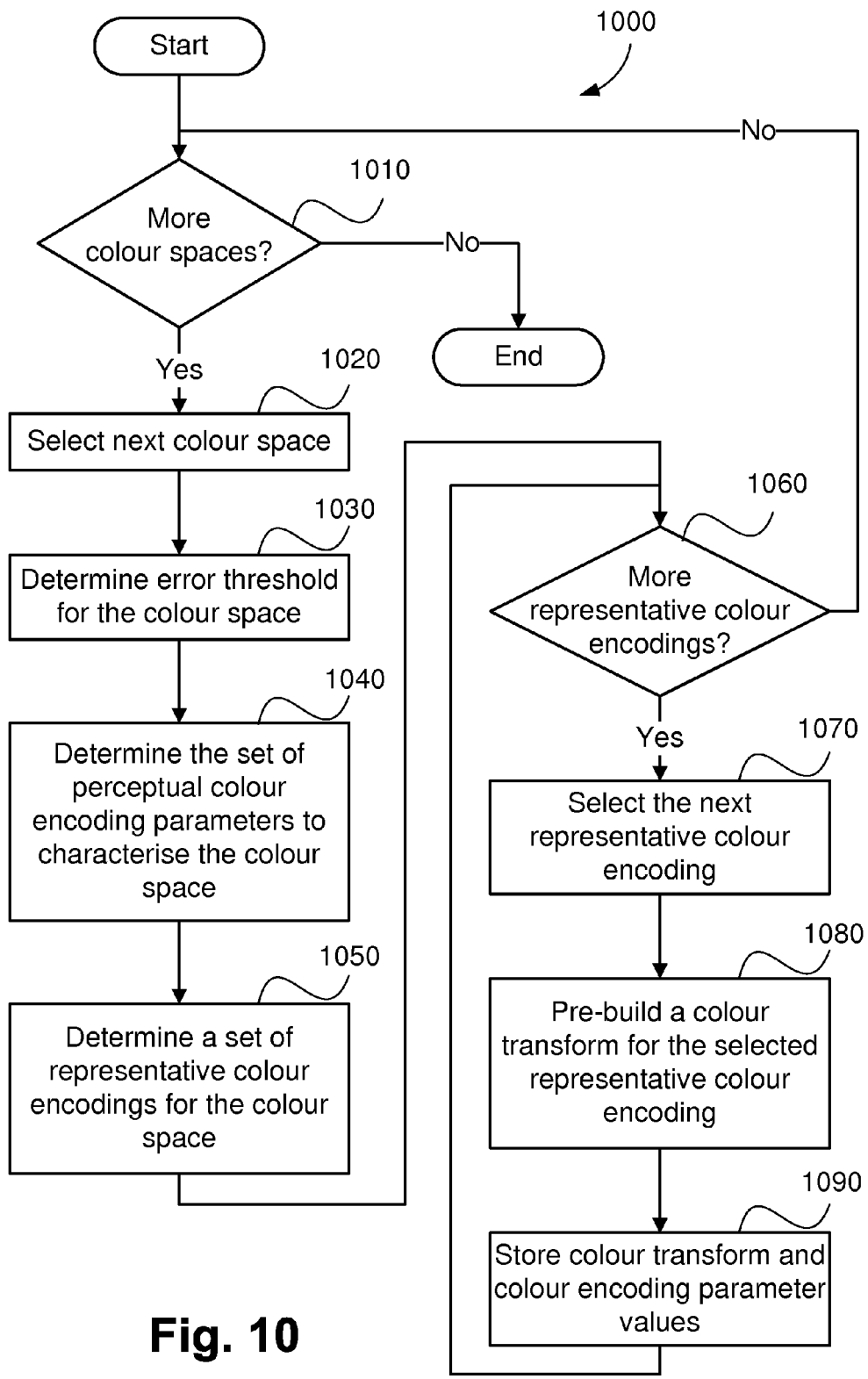
FIG. 10 is a flow diagram of a process for pre-building colour transforms according to the RCER arrangement.
Figure 11:
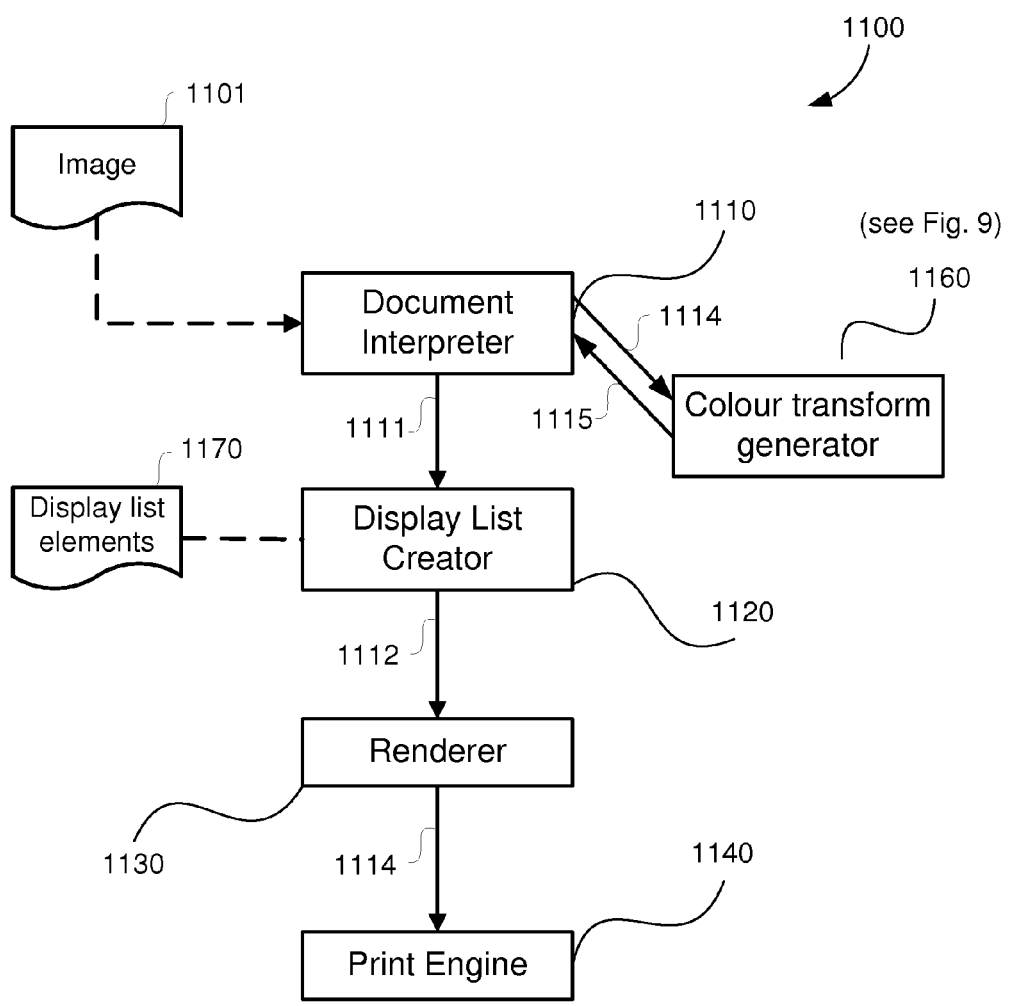
FIG. 11 is a schematic block diagram of a data-processing architecture according to the RCER arrangement.

The RCER method may be implemented using the computer system 100 wherein the processes of FIGS. 9, 10, and 11, to be described, may be implemented as one or more software application programs 133 executable within the computer system 100. In particular, the steps of the RCER method are effected by instructions 131 in the software 133 that are carried out within the computer system 100. The software instructions 131 may be formed as one or more code modules, each for performing one or more particular tasks. The software may also be divided into two separate parts, in which a first part and the corresponding code modules performs the RCER method and a second part and the corresponding code modules manage a user interface between the first part and the user.

The RCER application program 133 includes a sequence of instructions 131 that may include conditional branch and loop instructions. The program 133 may also include data 132 which is used in execution of the program 133. The instructions 131 and the data 132 are stored in memory locations 128-130 and 135-137 respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128-129.

The disclosed RCER colour encoding replacement arrangements may use input variables 154 (such as 1101 in FIG. 11 for example), that are stored in the memory 134 in corresponding memory locations 155-158. Examples of input variables 154 that may be used in the disclosed RCER arrangements include:
  input image 1101; and
  set of colour spaces The RCER arrangements produce output variables 161 (such as 1113 in FIG. 11 for example), that are stored in the memory 134 in corresponding memory locations 162-165. Examples of output variables 161 that may be used in the disclosed RCER arrangements include:
  pixel data 1113.

Intermediate variables 168 may be stored in memory locations 159, 160, 166 and 167. Examples of intermediate variables 168 that may be used in the disclosed RCER arrangements include:
  display list elements 1101;
  display lists 1112;
  error thresholds;
  perceptual attributes;
  representative colour encodings;
  colour transforms; and
  colour encoding parameters.

The register section 144-146, the arithmetic logic unit (ALU) 140, and the control unit 139 of the processor 105 work together to perform sequences of micro-operations needed to perform "fetch, decode, and execute" cycles for every instruction in the instruction set making up the RCER program 133. Each fetch, decode, and execute cycle comprises:
  (a) a fetch operation, which fetches or reads an instruction 131 from a memory location 128;
  (b) a decode operation in which the control unit 139 determines which instruction has been fetched; and
  (c) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIGS. 9-11 is associated with one or more segments of the RCER program 133, and is performed by the register section 144-147, the ALU 140, and the control unit 139 in the processor 105 working together to perform the fetch, decode, and execute cycles for every instruction in the instruction set for the noted segments of the program 133.

The RCER method may alternatively be implemented in dedicated hardware such as one or more gate arrays and/or integrated circuits performing the RCER functions or sub functions. Such dedicated hardware may also include graphic processors, digital signal processors, or one or more microprocessors and associated memories. If gate arrays are used, the process flow charts in FIGS. 9-11 may be converted to Hardware Description Language (HDL) form. This HDL description may be converted to a device level netlist which is used by a Place and Route (P&L) tool to produce a file which is downloaded to the gate array to program it with the design specified in the HDL description.

FIG. 11 is a functional block diagram of a data processing architecture 1100 according to an RCER arrangement. The data processing architecture 1100 may be implemented as at least part of the RCER application program 133 referred to above and may be invoked when a printing function is selected by another application (not shown) executing on the computer system 100. That other application may be any source of printable data comprising an image 1301 such as a word processing application, a browser, a graphics drawing package, and so forth.

The data processing architecture 1100 operates on a page description of the page comprising an image 1101 that is to be printed. The image 1101 may be represented using a digital document file 190. In this regard, the data processing architecture 1100 may execute within the computer module 101 to interpret and render the page description of the image 1101 for outputting bitmap colour channel data for reproduction on the printer 115. Alternatively the data processing architecture 400 may execute within the printer 115 which receives a page description from the computer module 101 and in this RCER arrangement the printer 115 performs the document interpreting and rendering as part of the reproduction process.

In this data processing architecture 1100 the document comprising the image 1101 that is submitted for printing is received from the computer module 101 and interpreted by a document interpreter 1110. The document interpreter 1110 generates drawing commands which are sent, as depicted by an arrow 1111 to a display list creator 1120. The display list creator 1120 translates the drawing commands into display list elements 1170. When a display list for a single page is completed, it is sent, as depicted by an arrow 1112 to a renderer 1130 for rendering. The Display List is in a format that can be easily processed by the renderer 1130. The renderer 1130 processes the Display List and generates pixel data which is sent, as depicted by an arrow 1113 to a print engine 1140 in the printer 115 for printing on hard copy. The document interpreter 1110, the display list creator 1120 and the renderer 1130 may be implemented as software modules in the software application 133 executing on the computer module 101, or as a separate purpose-designed hardware (or hybrid hardware/software) module executing on the printer 115.

Each input object in the input image 1101 can be represented using a different colour encoding. In order to simplify the colour processing performed by the Display List Creator 1120 and Renderer 1130, the Document Interpreter 1110 performs colour conversion on the input objects to obtain representations of the input objects using a common colour encoding, called the render colour space.

During the course of creating a display list, the document interpreter 1110 (in FIG. 11) supplies, as depicted by arrow 1114, a colour encoding of the input image 1301 to the colour transform generator 1160. It is the task of the colour transform generator 1160 to supply a colour transform 1115 that corresponds with the given colour encoding 1114.

Rather than generating a new colour transform specific to the colour encoding of each input object, the colour transform generator 1160 will, where possible, re-use a pre-built colour transform that represents a colour encoding that is perpetually similar to the colour encoding of the input object, in order to reduce time spent creating colour transforms.

FIG. 10 is a flow diagram depicting a process for building colour transforms according to one RCER arrangement. The set of colour transforms built using the described colour encoding clustering technique in the RCER arrangement is used to colour convert an image from an input colour encoding to an output colour encoding.

The process 1000 in FIG. 10 is performed, in the present RCER arrangement, by the processor 105 as directed by the RCER software application 133 executing on the computer 101.

Alternatively, because none of the inputs to process 1000 in FIG. 10 necessarily depend on the input image 1101, process 1000 can be performed in a variety of ways at a variety of different times. For example, process 1000 can be performed by a distinct software application on computer 101 or a different computer, and the output data (a set of pre-built colour transforms and corresponding colour encodings) stored on the hard disk drive 110, and loaded into memory 106 by the RCER software application 133 prior to selecting any colour transforms by process 200. Process 1000 can be performed in a factory during manufacture of a printer in which the RCER software application 133 is embedded; or performed regularly or semi-regularly during operation of a printer in which the RCER software application is embedded, making use of statistics collected during operation when determining the colour encodings required by each image 1101 processed.

The colour transform pre-building process 1000 begins in step 1010 by testing whether any further colour spaces are to have colour transforms pre-built. The set of colour spaces is pre-determined and typically consists of RGB and Gray, although other colour spaces are possible. If there are no further colour spaces to pre-build colour transforms for (the NO option of step 1010), the process terminates.

Otherwise (the YES option of step 1010), in step 1020, the next colour space is selected. In step 1030, an error threshold is determined for the colour space. The error threshold can be determined based on variables such as the capabilities of the print engine 1140, or the type of document 1101 being printed, or the threshold can be a pre-determined value stored on a storage device 109 of computer 101. In the present RCER arrangement, a pre-determined error threshold corresponding to a perceptual difference of 1 Delta $E^*_{ab}$ is chosen. Delta $E^*_{ab}$ is a standard measure of perceptual difference that will be familiar to those skilled in the art. A Delta $E^*_{ab}$ of 1 essentially corresponds to the smallest colour difference that the human eye can see.

In determining step 1040, the set of perceptual colour encoding parameters to use to characterise the colour space are determined.

A perceptual colour encoding parameter has a linear relationship with the perceptual difference in the results of colour conversion using a colour transform created from the colour encoding. For example, although gamma is a colour encoding parameter whose variation causes a significant perceptual difference, gamma is not a perceptual colour encoding parameter, because a linear variation in gamma does not produce a linear variation in the perceptual difference of the output of a colour conversion. Instead, to compare the effect of changing gamma in a perceptually linear way, perceptual colour encoding parameters can be derived that are sensitive to a difference in gamma, but which vary proportionally to the resultant perceptual difference. Further, perceptual colour encoding parameters for a given colour space are normalised with respect to each other, such that a delta in one perceptual colour encoding parameter will yield essentially the same amount of perceptual difference as the same delta in a different perceptual colour encoding parameter.

As previously described, perceptual colour encoding parameters used by the present RCER arrangement sufficient to fully characterise a PDF CalRGB colour encoding are:

the average mid-scale lightness contrast (designed to be sensitive to changes in gamma), measured by subtracting the L* coordinate of the CIE Lab value corresponding to RGB (0.45, 0.45, 0.45) from the L* coordinate of the CIE Lab value corresponding to RGB (0.55, 0.55, 0.55) and multiplying the result by a normalisation factor (provides one perceptual colour encoding parameter);

the chromaticities of several neutral scale colours (designed to be sensitive to differences in gamma between different colour components), measured by determining the a* and b* coordinates of the CIE Lab value corresponding to several neutral scale RGB values such as (0.25, 0.25, 0.25), (0.5, 0.5, 0.5), and (0.75, 0.75, 0.75), and optionally multiplying the results by a normalisation factor (provides six perceptual colour encoding parameters);

the calculated white point of the colour encoding (designed to be sensitive to changes in white point), measured by converting the CIE XYZ colorimetry values to a CIE Lab colour space with a common white point and using the a* and b* coordinates, and optionally multiplying the results by a normalisation factor (provides two perceptual colour encoding parameter); and the primaries of the colour encoding (designed to be sensitive to changes in chromaticity), measured by converting the tristimulus values for each of the primaries to a CIE Lab colour space with a common white point and using the a* and b* coordinates, and optionally multiplying the results by a normalisation factor (provides six perceptual colour encoding parameters).

Other sets of perceptual colour encoding parameters that fully characterise a colour encoding are possible. A similar and reduced set of perceptual colour encoding parameters can be used to fully characterise a colour encoding of a Gray colour space.

In step 1050, a set of representative colour encodings for the colour space are determined Each representative colour encoding is defined by its perceptual colour encoding parameter values. A representative colour encoding is a colour encoding that represents an ideal colour encoding that is the intent, or is close to the intent of, a significant proportion of expected input colour encodings encountered in typical documents. That is, its perceptual colour encoding parameters are, taken as a set, substantially numerically identical to those of many sets of perceptual colour encoding parameters of input colour encodings found in typical documents, such that substituting one of said input colour encodings with the perceptual colour encoding will result in substantially the same rendered output from print engine 1140.

It will be noted that in contrast to prior art methods, using a numerical measure in this situation results in a reliable comparison, because the colour encoding parameters are perceptual colour encoding parameters.

Representative colour encodings are preferably determined using a colour encoding clustering technique, in which a large set of sample colour encodings are analysed. In an exemplary implementation, the present RCER arrangement uses the method 200 previously described with reference to FIG. 2 in order to determine the set of representative colour encodings. The colour encoding clustering technique 200 involves determining a set of colour encoding clusters based on a clustering criterion related to the desired perceptual attributes of the candidate colour encoding in determining step 240. In an exemplary implementation of the determining step 240, the numerical values of the desired or important perceptual attributes or perceptual parameter is calculated in calculating step 230 and used to determine the set of clusters of candidate colour encodings in determining step 240. The candidate colour encodings are assigned to one of the clusters within the set of colour encoding clusters determined in the cluster determining step 240. Then, a representative colour encoding for each cluster within the set of colour encoding clusters is determined in the determining step 250. This representative colour encoding is determined based on the candidate colour encodings assigned to the individual cluster, as previously described.

The number of representative colour encodings in the set is not necessarily fixed, and may be determined as part of the colour encoding clustering process. As part of the determination step 1050, the values of each perceptual colour encoding parameter in the set of perceptual colour encoding parameters that was determined by step 340 are calculated. The calculation process 1400 will be described later in the specification with reference to FIG. 14. Representative colour encoding perceptual colour encoding parameters 1310 in FIG. 13 illustrates the perceptual colour encoding parameters for one representative colour encoding in the set of representative colour encodings determined by step 1050 in the present RCER arrangement.

The next few steps of process 1000 are concerned with pre-building a colour transform for each representative colour encoding. One of the built colour transforms is used to colour covert an image from an input colour encoding to an output colour encoding. In decision step 1060, RCER software application 133 or a distinct software application executing on computer 101 or a different computer tests whether there are more representative colour encodings to be processed. The first time step 1060 is performed, the check is equivalent to testing whether any representative colour encodings are present.

If so (the YES option of step 1060), then in selecting step 1070, the next representative colour encoding is selected, and in building step 1080, a colour transform is pre-built for the selected representative colour encoding. If the process 1000 is executed by the RCER software application 133 on computer 101, then in step 1090, the completed colour transform, along with the colour encoding parameter values for the representative colour encoding that were calculated as part of step 1050, is stored in memory 106. Otherwise, in step 1090, the colour transform and colour encoding parameter values are typically stored on hard disk drive 110, and later loaded into memory 106 by the RCER software application 133. The process then returns to step 1060 to test whether there any more representative colour encodings.

If there are no more representative colour encodings (the NO option of step 1060), the process returns to checking step 1010 to test whether any further colour spaces are to have colour transforms pre-built.

FIG. 9 is a flow diagram describing the process 900 performed by the colour transform generator 1160 (in FIG. 11) for selecting colour transforms according to one Representative Colour Encoding Replacement (RCER) arrangement and using the selected colour transform to colour convert the an input image 1101 in an RCER arrangement. The process 900 in FIG. 9 is performed, in the present RCER arrangement, by the processor 105 as directed by the RCER software application 133 executing on the computer 101.

The colour transform selection process 900 starts in step 910 by testing whether any further input colour encodings are present in the input image 1101. The first time step 910 is performed, the check is equivalent to testing whether any input colour encodings are present in the image 1101. If so (the YES option of step 910), then in step 920, the next input colour encoding is selected. The remainder of the process is concerned with producing a colour transform for the currently selected input colour encoding.

In step 930, the perceptual colour encoding parameter, or perceptual parameter in short, of the input colour encoding is calculated. The RCER software application 133 executing on the computer 101 calculates the values for each of a set of perceptual colour encoding parameters for the currently selected input colour encoding. The set of perceptual colour encoding parameters whose values are determined in step 930 is the same set as was determined in step 1040 of process 1000 in FIG. 10.

In the present embodiment, fifteen perceptual colour encoding parameters or perceptual parameter for the input colour encoding are calculated in step 930. This calculation is described in more detail later in this specification, with reference to process 1400 of FIG. 14. From the colour encoding, each of these fifteen values can be determined. The resulting set of values can be thought of as a point in a 15-dimensional space.

After calculating each perceptual colour encoding parameter value in step 930, the colour transform selection process continues in step 940 by testing whether any further representative colour encodings are present. Each representative colour encoding represents a large population of colour encodings known to be produced by producer applications of high level page descriptions. A set of representative colour encodings is pre-determined in process 1000 of FIG. 10, as was previously described.

The first time step 940 is performed, the check is equivalent to testing whether any representative colour encodings are present. If not (the NO option of step 940), then in step 950, a colour transform is created from the input colour encoding. In this case, no suitable pre-built colour transform was found, and so a one-off colour transform is created for the currently selected input colour encoding. The process then returns to step 910.

If there are more representative colour encodings (the YES option of step 940), then the next few steps determine whether the representative colour encoding can be considered a match for the input colour encoding. In step 960, the next representative colour encoding is selected. In step 970, the perceptual colour encoding parameter, or the perceptual parameter, of a representative colour encoding is determined. The RCER software application 133 executing on the computer 101 retrieves the perceptual colour encoding parameters of the selected representative colour encoding from memory 106. The representative colour encoding uses the same perceptual colour encoding parameters as were used in step 930, when the perceptual colour encoding parameters of the selected input colour encoding were calculated. In the present embodiment, fifteen perceptual colour encoding parameter values are determined.

In step 980, the perceptual colour encoding parameters for the input colour encoding are compared with the perceptual colour encoding parameters for the representative colour encoding. This comparison is preferably performed as a distance calculation in n-dimensional space, such as the Euclidean distance, between the perceptual colour encoding parameter (perceptual parameter) of the input colour encoding and the perceptual colour encoding parameter (perceptual parameter) of the representative colour encoding.

The result is compared to a pre-determined threshold, set such that if the resultant distance result is less than the threshold, the input colour encoding is close enough to the representative colour encoding such that colour errors produced by substituting the representative colour encoding for the input colour encoding will be too small to detect with the human eye.

If the perceptual colour encoding parameters are determined to be close to each other as described above (the YES option of step 980), then in step 990, the pre-built colour transform associated with the representative colour encoding is selected, and no new colour transform is created. In other words, if the perceptual colour encoding parameter (perceptual parameter) of a representative colour encoding is within a predetermined threshold in terms of distance from the perceptual colour encoding parameter (perceptual parameter) of the input colour encoding, the colour transform associated with the representative colour encoding is selected. The process then returns to step 910.

If the perceptual colour encoding parameters are determined to not be close to each other as described above (the NO option of step 980), then the process returns to step 940, and any further representative colour encodings are tested for suitability. The process continues until a representative colour encoding is found that is a match for the input colour encoding (in which case a pre-built colour transform is selected in step 990), or there are no further representative colour encodings (in which case a new colour transform is created in step 950). In either case, the process subsequently returns to step 910 to process the next input colour encoding. If there are no more input colour encodings (the NO option of step 910), the process proceeds to colour converting step 995, wherein the selected colour transform is used either immediately or at a later stage to colour covert an image from an input colour encoding to an output colour encoding. In colour converting step 995, the RCER software application 133 performs one or more colour conversion operations using first input colour encoding 1220 as the source colour encoding, saving the time of creating a colour transform specifically for first input colour encoding 1220.

Figure 14:
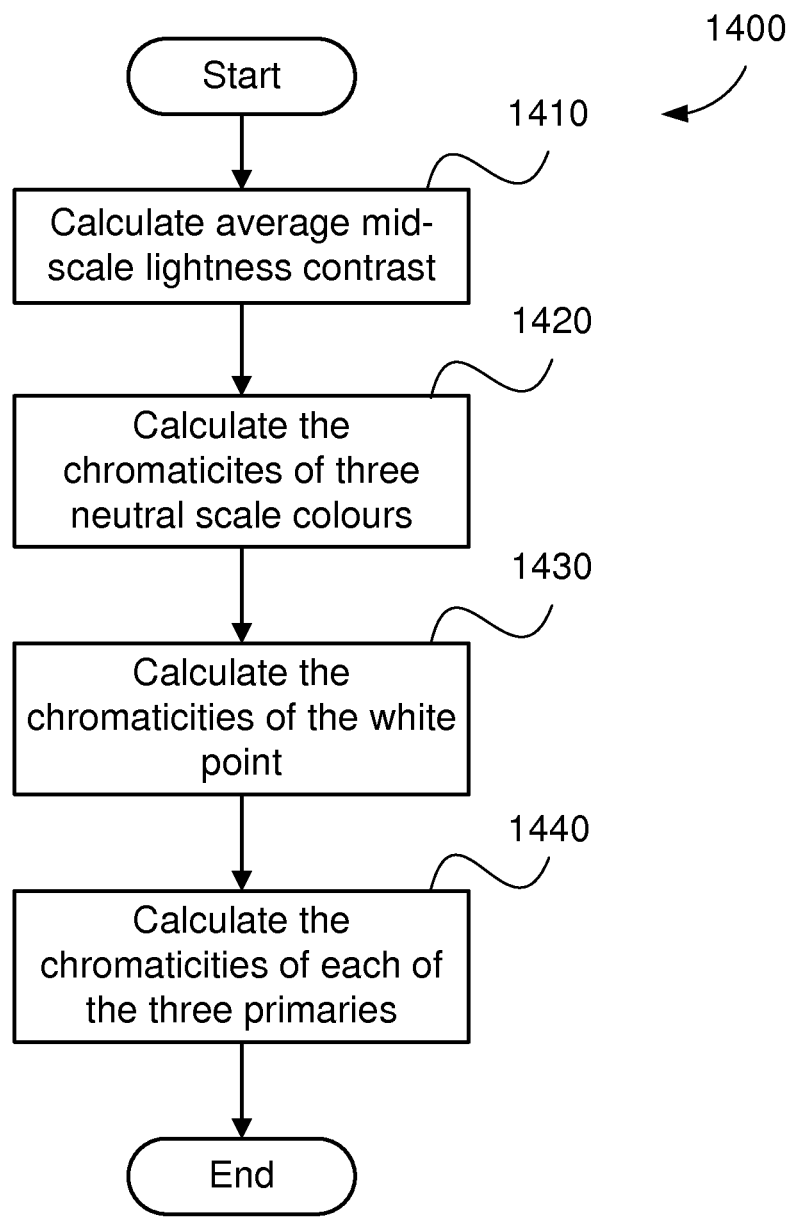
FIG. 14 is a flow diagram depicting a perceptual colour encoding parameter calculation process used within the RCER arrangements herein described.

FIG. 14 is a flow diagram depicting the perceptual colour encoding parameter calculation process 1400 performed as part of step 930 of process 900 in FIG. 9, and step 1050 of process 1000 in FIG. 10, by the processor 105 as directed by the RCER software application 133 executing on the computer 101. The steps of process 1400 in FIG. 14 will now be described with reference to first input CalRGB colour encoding 1220 of FIG. 12. Those skilled in the art will recognise that similar calculations can be performed to calculate perceptual colour encoding parameter values for a colour encoding of a Gray colour space.

In step 1410, the processor 105 as directed by the RCER software application 133 calculates the average mid-scale lightness contrast $C_{L^*}$ of first input colour encoding 1220. This is done by:

(a) Calculating $L^*_{0.45}$, the luminance of CalRGB (0.45, 0.45, 0.45), adapted to a standard white point, according to the steps of:

Converting CalRGB (0.45, 0.45, 0.45) to an intermediate XYZ value using the first input colour encoding's gamma values 1221 and RGB matrix 1222;

$$R' = R^{X_R} = 0.45^{1.799886} \approx 0.2375867$$

$$G' = G^{X_G} = 0.45^{1.799886} \approx 0.2375867$$

$$B' = B^{X_B} = 0.45^{1.799886} \approx 0.2375867$$

$$\begin{bmatrix} X \\ Y \\ Z \end{bmatrix} = M \cdot \begin{bmatrix} R' \\ G' \\ B' \end{bmatrix}$$

$$\approx \begin{bmatrix} 0.4497 & 0.2446 & 0.0252 \\ 0.3163 & 0.6720 & 0.1412 \\ 0.1845 & 0.0833 & 0.9227 \end{bmatrix} \cdot \begin{bmatrix} 0.2375867 \\ 0.2375867 \\ 0.2375867 \end{bmatrix}$$

$$\approx \begin{bmatrix} 0.2258261 \\ 0.2375629 \\ 0.2587556 \end{bmatrix}$$

Performing chromatic adaptation to compute the corresponding XYZ colour whose appearance to an observer adapted to a standard reference white point matches the appearance of the intermediate XYZ colour when viewed by an observer adapted to the white point implicit in the RGB matrix 1222. In this embodiment, a Bradford chromatic adaptation Transform, a standard method that will be known to those skilled in the art, is used to find the corresponding XYZ colour that's chromatically adapted to the D50 reference white;

$$\begin{bmatrix} X' \\ Y' \\ Z' \end{bmatrix} = \text{To\_D50\_via\_Bradford\_transform} \left( \begin{bmatrix} 0.2258261 \\ 0.2375629 \\ 0.2587556 \end{bmatrix} \right)$$

$$= \begin{bmatrix} 0.2291048 \\ 0.2375867 \\ 0.1960328 \end{bmatrix}$$

Converting the corresponding D50 XYZ colour to an L*a*b* representation;

$$X_n = 0.9643$$
$$Y_n = 1.0000$$
$$Z_n = 0.8251$$

$$f(t) = \begin{cases} t^{\frac{1}{3}}, & t > \left(\frac{6}{29}\right)^3 \\ \frac{1}{3} \times \left(\frac{29}{6}\right)^2 \times t + \frac{4}{29}, & \text{otherwise} \end{cases}$$

$$L^* = 116 \times f\left(\frac{Y}{Y_n}\right) - 16 \approx 116 \times 0.6193565 - 16 \approx 55.8455$$

$$a^* = 500 \times \left(f\left(\frac{X}{X_n}\right) - f\left(\frac{Y}{Y_n}\right)\right)$$
$$\approx 500 \times (0.6193565 - 0.6193565)$$
$$\approx 0.000000$$

$$b^* = 200 \times \left(f\left(\frac{Y}{Y_n}\right) - f\left(\frac{Z}{Z_n}\right)\right)$$
$$\approx 200 \times (0.6193565 - 0.613565)$$
$$\approx 0.000000$$

And taking the L* result from the final calculation. That is, $L^*_{0.45}=55.84535$.

(b) Calculating $L^*_{0.55}$, the luminance of CalRGB (0.55, 0.55, 0.55), adapted to a standard white point. This value is calculated using the same steps as were used to calculate $L^*_{0.45}$ but with different input values, yielding a result of $L^*_{0.55}=65.03739$.

(c) Calculating $C_{L^*}$ using the equation $C_{L^*}=k_p (L^*_{0.55}-L^*_{0.45})$, where $k_p=1.0$. $C_{L^*}=1.0\times(65.03739-55.84535)=9.19194$.

In step 1420, the processor 105 as directed by the RCER software application 133 calculates the chromaticities $a^*_{0.25}$, $b^*_{0.25}$, $a^*_{0.50}$, $b^*_{0.50}$, $a^*_{0.75}$, and $b^*_{0.75}$, of three neutral scale colours (0.25, 0.25, 0.25), (0.50, 0.50, 0.50), and (0.75, 0.75, 0.75). This is done using the same steps that were used to calculate $L^*_{0.45}$, but using the three neutral scale colours (0.25, 0.25, 0.25), (0.50, 0.50, 0.50), and (0.75, 0.75, 0.75) as input values, and taking the a* and b* results in the final step rather than the L* result. For the first input colour encoding 520, this yields $a^*_{0.25}=0$, $b^*_{0.25}=0$, $a^*_{0.50}=0$, $b^*_{0.50}=0$, $a^*_{0.75}=0$, and $b^*_{0.75}=0$.

In step 1430, the processor 105 as directed by the RCER software application 133 calculates the chromaticities $a^*_{1.0}$ and $b^*_{1.0}$ of the white point of first input colour encoding 520. This is done using the same steps that were used to calculate $L^*_{0.45}$, but using white (1.0, 1.0, 1.0) as input values, and taking the a* and b* results in the final step rather than the L* result. For the first input colour encoding 520, this yields $a^*_{1.0}=0$, and $b^*_{1.0}=0$.

Finally, in step 1440, the processor 105 as directed by the RCER software application 133 calculates the chromaticities $a^*_R$, $b^*_R$, $a^*_G$, $b^*_G$, $a^*_B$, and $b^*_B$ of the primaries of first input colour encoding 1220. This is done using the same steps that were used to calculate $L^*_{0.45}$, but using the three primaries (1.0, 0.0, 0.0), (0.0, 1.0, 0.0), and (0.0, 0.0, 1.0) as input values, and taking the a* and b* results in the final step rather than the L* result. For the first input colour encoding 1220, this yields $a^*_R=77.91152$, $b^*_R=70.48452$, $a^*_G=-84.93668$, $b^*_G=72.03419$, $a^*_B=60.04800$, and $b^*_B=-105.43734$.

The perceptual colour encoding parameter values of first input colour encoding 1220 as calculated by process 1400 are summarised in perceptual attributes table 1320 of FIG. 13. Likewise, applying process 1400 to the gamma values 1211 and RGB matrix 1212 of representative colour encoding 1210 yields perceptual colour encoding parameters 1310, and applying process 700 to the gamma values 531 and RGB matrix 532 of second input colour encoding 1230 yields perceptual colour encoding parameters 1330.

Figure 12:
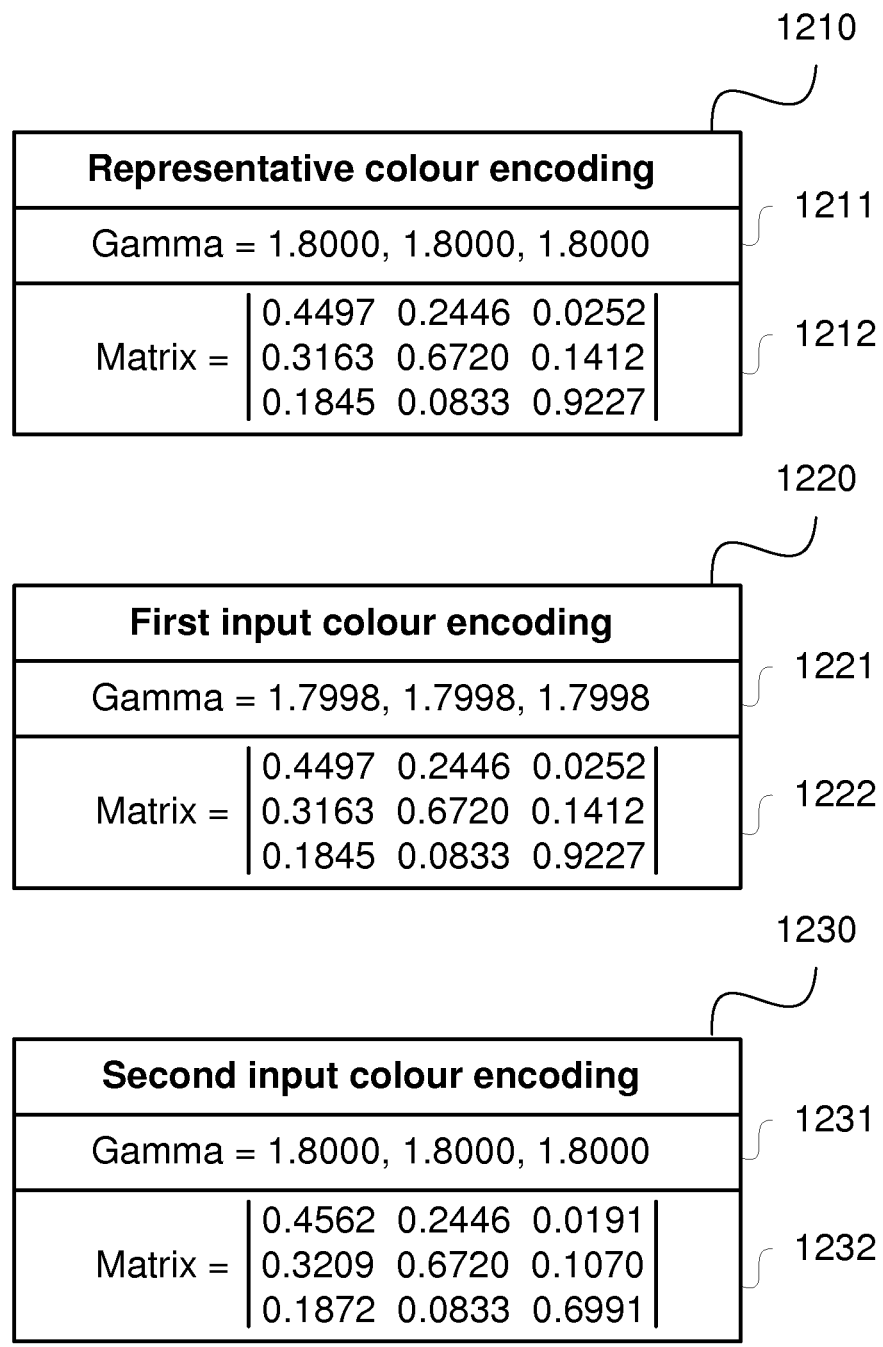
FIG. 12 is a schematic block diagram showing three RGB colour encodings, used to illustrate process of FIG. 9.

Process 900 of FIG. 9 will now be illustrated using exemplary colour encodings 1210, 1220, and 1230 of FIG. 12. That is, the exemplary set of representative colour encodings comprises a single representative colour encoding 1210, and the input document 1101 contains first and second input colour encodings 1220 and 1230 of FIG. 12.

In step 910, processor 105 as directed by the RCER software application 133 executing on computer 101 determines whether there are any further input colour encodings to process. There are two input colour encodings 1220 and 1230, so the process continues to step 920, in which first input colour encoding 1220 is selected.

In step 930, the perceptual colour encoding parameter values (perceptual parameter values) of first input colour encoding 1220 are calculated. This calculation is performed according to process 1400 of FIG. 14, and results in perceptual colour encoding parameters (perceptual parameter) 1320 as shown in FIG. 13. These results may be stored in memory 106 or a storage device 109 of computer 101 as part of statistical data gathered for later updating of the clustering according to an embodiment of process 1000 of FIG. 10.

In step 940, the RCER software application 133 determines whether there are any further representative colour encodings. There is one representative colour encoding 1210, so the process continues in step 960, where representative colour encoding 1210 is selected.

In determining step 970, the perceptual colour encoding parameter values (perceptual parameter values) 1310 corresponding to representative colour encoding 1210 are retrieved from memory 106 or from hard disk 110, having been previously calculated as part of step 1050 and stored in step 1090 of process 1000 of FIG. 10.

In step 980, the first input perceptual colour encoding parameters (perceptual parameter) 1320 are compared with the representative perceptual colour encoding parameters (perceptual parameter) 1310 using a Euclidean distance calculation. Because the only difference between input perceptual colour encoding parameter values 1320 and representative perceptual colour encoding parameter values 1310 is in the average lightness contrast value, $C_{L*}$, the Euclidean distance between these two sets of perceptual colour encoding parameters is just the absolute difference of $C_{L*}$ values; that is, 9.19238−9.19194, or 0.00044. Because this value is less than the pre-determined threshold of 1.0 (corresponding to 1 Delta $E*_{colour}$), representative colour encoding 1210 is selected for use in place of first input colour encoding 1220. In step 990, the pre-built colour transform associated with representative colour encoding 1210 is selected and used in colour converting step 995 either immediately or at a later stage to colour covert an image from an input colour encoding to an output colour encoding. In colour converting step 995, the RCER software application 133 performs one or more colour conversion operations using first input colour encoding 1220 as the source colour encoding, saving the time of creating a colour transform specifically for first input colour encoding 1220.

In step 910, processor 105 as directed by the RCER software application 133 executing on computer 101 determines whether there are any further input colour encodings to process. There is one remaining colour encoding 1230 to be processed, so the process continues to step 920, in which second input colour encoding 1230 is selected.

In step 930, the perceptual colour encoding parameter values of second input colour encoding 1230 are calculated. This calculation is performed according to process 1400 of FIG. 14, and results in perceptual colour encoding parameters 1330 as shown in FIG. 13.

In step 940, the RCER software application 133 again determines whether there are any further representative colour encodings. There is one representative colour encoding 1210, so the process continues to step 960, where representative colour encoding 1210 is selected, and step 970, where the perceptual colour encoding parameter values 1310 corresponding to representative colour encoding 1210 are retrieved from memory 106 or from hard disk 110.

In step 980, the second input perceptual colour encoding parameters 1330 are compared with the representative perceptual colour encoding parameters 1310 using a Euclidean distance calculation. Six of the perceptual colour encoding parameters (the colour encoding primaries $a*_R$, $b*_R$, $a*_G$, $b*_G$, $a*_B$, and $b*_B$) differ. The Euclidean distance is the square root of the sum of the squares of the differences, which gives a value of 13.75082. Because this value is greater than the pre-determined threshold of 1.0, representative colour encoding 1210 is rejected for use in place of second input colour encoding 1230, and so colour transform selection process 900 continues at step 940, to test whether there are any further representative colour encodings. There are not, so in step 950, a colour transform is created specifically for second input colour encoding 1230, and is used either immediately or at a later stage when RCER software application 133 performs one or more colour conversion operations using second input colour encoding 1230 as the source colour encoding.

Finally, in step 910, there are no further input colour encodings, so process 900 proceed to colour converting step 995, wherein the either the selected colour transform from selection step 990 or the created colour transform from creation step 950 to colour covert an image from an input colour encoding to an output colour encoding. In colour converting step 995, the RCER software application 133 performs one or more colour conversion operations using first input colour encoding 1220 as the source colour encoding, saving the time of creating a colour transform specifically for first input colour encoding 1220.

In the exemplary implementation of the embodiment of the invention, the colour transform is updated after colour conversation of an image from an input colour encoding to an output colour encoding is executed. In the same manner of colour encoding clustering technique 200 described in FIG. 2 the present RCER arrangement determine the updated set of representative colour encodings. The colour encoding updating technique, similar to the colour encoding clustering technique 200, involves adding the colour encoding encountered during the colour conversion of the image to the set of candidate colour encodings in colour converting step 995. Then, a new set of colour encoding clusters based on a clustering criterion related to the desired perceptual attributes of the candidate colour encoding is determined as in determining step 240. In an exemplary implementation of the determining step 240, the numerical values of the desired or important perceptual attributes or perceptual parameter is calculated in calculating step 230. These numerical values are used to determine the new set of clusters of candidate colour encodings, including the newly added colour encoding encountered during the colour conversion step 995, as in determining step 240. The candidate colour encodings are assigned to one of the new clusters within the new set of colour encoding clusters determined as in the cluster determining step 240. Then, a representative colour encoding for each new cluster within the new set of colour encoding clusters is determined in the determining step 250. This representative colour encoding is determined based on the candidate colour encodings assigned to the individual cluster, as previously described.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. A method of determining one or more representative colour encodings for use in processing an image, said method comprising:

determining a set of colour encoding clusters for a plurality of candidate colour encodings based on a clustering criterion related to one or more desired perceptual attributes of the plurality of candidate colour encodings, each candidate colour encoding being a specification for interpreting a plurality of encoded colour values to determine appearance of said plurality of encoded colour values, wherein at least some of the candidate colour encodings are associated with a mapping from a first colour space to a second colour space, each of the candidate colour encodings encodes a respective range of colour values, and the respective ranges of the plurality of candidate colour encodings overlap;

assigning each candidate colour encoding to one cluster within the set of colour encoding clusters; and determining a representative colour encoding for each cluster within the set of colour encoding clusters depending on the candidate colour encodings assigned to each cluster.

2. A method according to claim 1, where the set of colour encoding clusters is derived using at least one of:
   (i) a single-step clustering method;
   (ii) a successive clustering method;
   (iii) a partitional clustering method; and
   (iv) a hierarchical clustering method.

3. A method according to claim 2, wherein the step of deriving the set of colour encoding clusters comprises the steps of:
selecting the desired perceptual attribute and the numerical value associated with said desired perceptual attribute for a current clustering stage;
determining a clustering objective for the current clustering stage; and
deriving the set of colour encoding clusters by clustering the candidate colour encodings based on the determined clustering objective.

4. A method according to claim 1, further comprising the steps of:
determining said one or more desired perceptual attributes of the plurality of candidate colour encodings;
determining a numerical value for each of the desired perceptual attributes of the candidate colour encodings; and
determining the set of colour encoding clusters for the plurality of candidate colour encodings based on at least one determined numerical value of the desired perceptual attribute.

5. A method according to claim 1, further comprising the step of:
replacing the candidate colour encodings assigned to each cluster with the determined representative colour encoding for each cluster.

6. A method according to claim 1, where the desired perceptual attributes of the candidate colour encodings include at least one of encoding white point, chromaticities of primaries, neutral contrast and neutral scale chromaticity.

7. A method according to claim 1, wherein the respective ranges of the plurality of candidate colour encodings are all the same.

8. A method according to claim 1, wherein at least one of the colour encoding clusters is assigned more than one of the candidate colour encodings.

9. A method of colour converting an image from an input colour encoding to an output colour encoding for use in processing an image, wherein the input colour encoding is associated with a first colour space and the output colour encoding is associated with a second colour space, said method comprising:
building a set of representative colour encodings for a plurality of candidate colour encodings using a clustering technique, each candidate colour encoding being a specification for interpreting a plurality of encoded colour values to determine appearance of said plurality of encoded colour values, each said representative colour encoding being determined depending on the candidate colour encodings assigned to each of a set of colour encoding clusters, wherein each said representative colour encoding is associated with a colour transform, each of the candidate colour encodings encodes a respective range of colour values, and the respective ranges of the plurality of candidate colour encodings overlap;
calculating a first perceptual parameter of the input colour encoding;
determining a second perceptual parameter of at least some of the representative colour encodings;
comparing the first perceptual parameter and each of the second perceptual parameters;
selecting a representative colour encoding from the set of colour encodings based on said comparing step; and
colour converting the image to the output colour encoding using the colour transform associated with the selected representative colour encoding.

10. The method according to claim 9, wherein said clustering technique comprises the steps of:
determining the set of colour encoding clusters based on a clustering criterion related to one or more desired perceptual attributes of a plurality of candidate colour encodings;
assigning each candidate colour encoding to one cluster within the set of colour encoding clusters; and
determining a representative colour encoding for each cluster within the set of colour encoding clusters depending on the candidate colour encodings assigned to each cluster.

11. The method according to claim 9, wherein said comparing step comprises:
calculating a distance between the first perceptual parameter and the second perceptual parameter; and
selecting the colour transform associated with the selected representative colour encoding, wherein said selected representative colour encoding has the second perceptual parameter being within a predetermined threshold from the first perceptual parameter of the input colour encoding.

12. The method according to claim 9, wherein said set of pre-built transforms is updated after performing said colour conversion one or more times, said update comprising the steps of:
adding at least one colour encoding encountered during said colour converting step to said plurality of candidate colour encodings;
determining a new set of colour encoding clusters based on a clustering criterion related to one or more desired perceptual attributes of the plurality of candidate colour encodings;
assigning each candidate colour encoding to one cluster within the new set of colour encoding clusters; and
determining a representative colour encoding for each cluster within the new set of colour encoding clusters depending on the candidate colour encodings assigned to each cluster.

13. A system for determining one or more representative colour encodings for use in processing an image, said system comprising:
a memory for storing data and a computer program;
a processor coupled to said memory for executing said computer program, said computer program comprising instructions for:
determining a set of colour encoding clusters based on a clustering criterion related to one or more desired perceptual attributes of a plurality of candidate colour encodings, each candidate colour encoding being a specification for interpreting a plurality of encoded colour values to determine appearance of said plurality of encoded colour values, wherein at least some of the candidate colour encodings are associated with a mapping from a first colour space to a second colour space, each of the candidate colour encodings encodes a respective range of colour values, and the respective ranges of the plurality of candidate colour encodings overlap;
assigning each candidate colour encoding to one cluster within the set of colour encoding clusters; and
determining a representative colour encoding for each cluster within the set of colour encoding clusters depending on the candidate colour encodings assigned to each cluster.

14. A non-transitory computer readable medium having a computer program stored thereon for determining one or more representative colour encodings for use in processing an image, said program comprising:
  code for determining a set of colour encoding clusters based on a clustering criterion related to one or more desired perceptual attributes of a plurality of candidate colour encodings, each candidate colour encoding being a specification for interpreting a plurality of encoded colour values to determine appearance of said plurality of encoded colour values, wherein at least some of the candidate colour encodings are associated with a mapping from a first colour space to a second colour space, each of the candidate colour encodings encodes a respective range of colour values, and the respective ranges of the plurality of candidate colour encodings overlap;
  code for assigning each candidate colour encoding to one cluster within the set of colour encoding clusters; and
  code for determining a representative colour encoding for each cluster within the set of colour encoding clusters depending on the candidate colour encodings assigned to each cluster.

15. A system for colour converting an image from an input colour encoding to an output colour encoding for use in processing an image, wherein the input colour encoding is associated with a first colour space and the output colour encoding is associated with a second colour space, said system comprising:
  a memory for storing data and a computer program;
  a processor coupled to said memory for executing said computer program, said computer program comprising instructions for:
    building a set of representative colour encodings for a plurality of candidate colour encodings using a clustering technique, each candidate colour encoding being a specification for interpreting a plurality of encoded colour values to determine appearance of said plurality of encoded colour values, each said representative colour encoding being determined depending on the candidate colour encodings assigned to each of a set of colour encoding clusters, wherein each said representative colour encoding is associated with a colour transform, each of the candidate colour encodings encodes a respective range of colour values, and the respective ranges of the plurality of candidate colour encodings overlap;
    calculating a first perceptual parameter of the input colour encoding;
    determining a second perceptual parameter of at least some of the representative colour encodings;
    comparing the first perceptual parameter and each of the second perceptual parameters;
    selecting a representative colour encoding from the set of colour encodings based on said comparing step; and
    colour converting the image to the output colour encoding using the colour transform associated with the selected representative colour encoding.

16. A non-transitory computer readable medium having a computer program stored thereon for colour converting an image from an input colour encoding to an output colour encoding for use in processing an image, wherein the input colour encoding is associated with a first colour space and the output colour encoding is associated with a second colour space, said program comprising:
  code for building a set of representative colour encodings for a plurality of candidate colour encodings using a clustering technique, each candidate colour encoding being a specification for interpreting a plurality of encoded colour values to determine appearance of said plurality of encoded colour values, each said representative colour encoding being determined depending on the candidate colour encodings assigned to each of a set of colour encoding clusters, wherein each said representative colour encoding is associated with a colour transform, each of the candidate colour encodings encodes a respective range of colour values, and the respective ranges of the plurality of candidate colour encodings overlap;
  code for calculating a first perceptual parameter of the input colour encoding;
  code for determining a second perceptual parameter of at least some of the representative colour encodings;
  code for comparing the first perceptual parameter and each of the second perceptual parameters;
  code for selecting a representative colour encoding from the set of colour encodings based on said comparing step; and
  code for colour converting the image to the output colour encoding using the colour transform associated with the selected representative colour encoding.

* * * * *